US012745156B2

(12) United States Patent
Kim et al.

(10) Patent No.: US 12,745,156 B2
(45) Date of Patent: Sep. 22, 2026

(54) APPARATUS AND METHOD FOR ESTABLISHING TRAFFIC PATH AND FORWARDING TRAFFIC PATH IN MOBILE COMMUNICATION SYSTEM

(71) Applicant: ELECTRONICS AND TELECOMMUNICATIONS RESEARCH INSTITUTE, Daejeon (KR)

(72) Inventors: Sun Jin Kim, Sejong-si (KR); Nam Seok Ko, Daejeon (KR); Jong Seok Lee, Daejeon (KR); Sun Me Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 258 days.

(21) Appl. No.: 18/619,394

(22) Filed: Mar. 28, 2024

(65) Prior Publication Data

US 2024/0334295 A1 Oct. 3, 2024

(30) Foreign Application Priority Data

Mar. 28, 2023 (KR) ........................ 10-2023-0040819
Jun. 27, 2023 (KR) ........................ 10-2023-0082281

(51) Int. Cl.
*H04W 40/02* (2009.01)
*H04L 45/302* (2022.01)

(52) U.S. Cl.
CPC ........... *H04W 40/02* (2013.01); *H04L 45/306* (2013.01)

(58) Field of Classification Search
CPC ............................. H04W 40/02; H04L 45/306
See application file for complete search history.

(56) References Cited

U.S. PATENT DOCUMENTS

| | | | |
|---|---|---|---|
| 9,948,553 | B2 | 4/2018 | Kwak et al. |
| 2015/0249600 | A1 | 9/2015 | Numata |

(Continued)

FOREIGN PATENT DOCUMENTS

| | | | |
|---|---|---|---|
| JP | 2015029346 | A | 2/2015 |
| KR | 10-2021-0029203 | A | 3/2021 |

(Continued)

OTHER PUBLICATIONS

3GPP, "3rd Generation Partnership Project; Technical Specification Group Services and System Aspects; Policy and charging control framework for the 5G System (5GS); Stage 2 (Release 18)", 3GPP TS 23.503 V18.0.0 (Dec. 2022).

*Primary Examiner* — Duc C Ho
(74) *Attorney, Agent, or Firm* — LRK PATENT LAW FIRM

(57) ABSTRACT

An apparatus for establishing a traffic path and forwarding an established traffic path in a mobile communication system is provided, which includes: a memory storing at least one program; a transceiver transmitting and receiving at least one signal; and a processor executing at least one program stored in the memory, wherein the processor is configured to: obtain at least one of topology information and load information, compute a traffic path for each application based on at least one of the topology information and the load information, and generate a routing identification (RID) for each application based on the computed traffic path.

18 Claims, 17 Drawing Sheets

(56) References Cited

U.S. PATENT DOCUMENTS

| | | | | |
|---|---|---|---|---|
| 2019/0059067 | A1 | 2/2019 | Lee et al. | |
| 2019/0191330 | A1* | 6/2019 | Dao | H04L 12/4633 |
| 2019/0357301 | A1* | 11/2019 | Li | H04W 40/20 |
| 2020/0303209 | A1 | 9/2020 | Lee et al. | |
| 2021/0037410 | A1* | 2/2021 | Lee | H04W 28/0268 |
| 2023/0397086 | A1 | 12/2023 | Kim et al. | |
| 2025/0212265 | A1* | 6/2025 | Zheng | H04W 8/26 |

FOREIGN PATENT DOCUMENTS

| | | | |
|---|---|---|---|
| KR | 10-2022-0044328 | A | 4/2022 |
| KR | 10-2023-0066112 | A | 5/2023 |
| WO | 2020/018623 | A1 | 1/2020 |

* cited by examiner

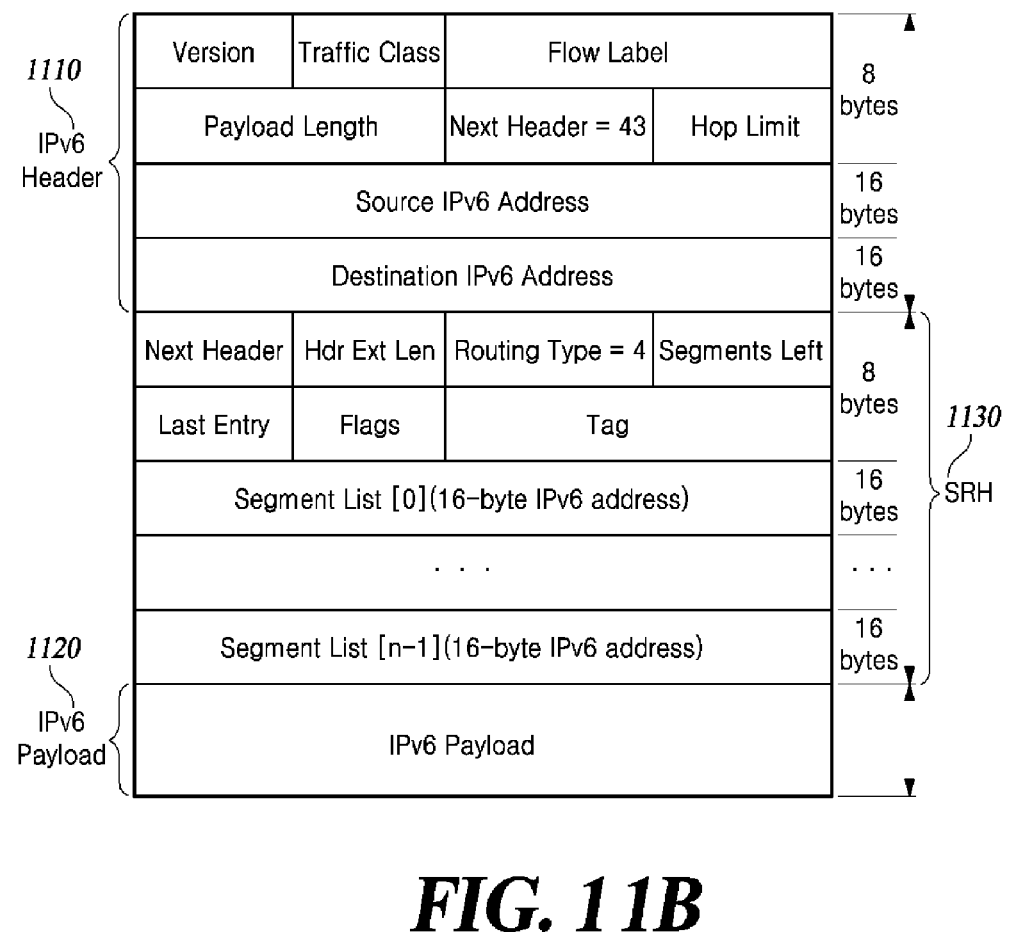

| Version | Traffic Class | Flow Label | |
|---|---|---|---|
| Payload Length | | Next Header = 43 | Hop Limit |
| Source IPv6 Address | | | |
| Destination IPv6 Address | | | |
| Next Header | Hdr Ext Len | Routing Type = 4 | Segments Left |
| Last Entry | Flags | Tag | |
| Segment List [0](16-byte IPv6 address) | | | |
| . . . | | | |
| Segment List [n-1](16-byte IPv6 address) | | | |
| IPv6 Payload | | | |

FIG. 11B

APPARATUS AND METHOD FOR ESTABLISHING TRAFFIC PATH AND FORWARDING TRAFFIC PATH IN MOBILE COMMUNICATION SYSTEM

CROSS-REFERENCE TO RELATED APPLICATIONS

The present application claims priority to Patent Application No. 10-2023-0040819, filed on Mar. 28, 2023 in Korea Intellectual Property Office, and Patent Application No. 10-2023-0082281, filed on Jun. 27, 2023 in Korea Intellectual Property Office, the entire contents of which are incorporated herein by reference.

BACKGROUND

1. Technical Field

The present disclosure relates to an apparatus and a method for establishing a traffic path and forwarding the established traffic path in a mobile communication system and more specifically, to an apparatus and a method for establishing a traffic path utilizing user equipment (UE) route selection policy (URSP) and forwarding the established traffic path.

2. Description of Related Art

The following description merely provides background information relevant to the present embodiments and does not constitute prior art.

With advances of the 5G (Generation) mobile technology, various network-based application services are spreading. The application services are evolving into a distributed service structure based on network function virtualization (NFV).

However, because the current mobile network architecture was designed without consideration of the transport layer, the current mobile network may not quickly respond to the bandwidth and low latency requirements of various application services.

Also, the user plane layer of the mobile communication system is divided into a radio access network, core network connected by GTP-U (General Packet Radio Service (GPRS) Tunneling Protocol-User plane)-based tunneling, and service network. Accordingly, there are limitations in optimizing and operating network paths according to the requirements of individual application services.

SUMMARY

The present disclosure may provide a method and an apparatus for establishing a traffic path and forwarding the established traffic path in a mobile communication system.

The present disclosure may provide a method and an apparatus for establishing a traffic path utilizing UE route selection policy (URSP) and forwarding the established traffic path in a mobile communication system.

The present disclosure may provide a method and an apparatus for establishing a traffic path based on a network function (NF) for calculating and determining a traffic path and forwarding the established traffic path in a mobile communication system.

Technical objects to be achieved by the present disclosure are not limited to those described above, and other technical objects not mentioned above may also be clearly understood from the descriptions given below by those skilled in the art to which the present disclosure belongs.

According to an embodiment of the present disclosure, an apparatus for establishing a traffic path and forwarding an established traffic path in a mobile communication system, the apparatus comprising: a memory storing at least one program; a transceiver transmitting and receiving at least one signal; and a processor executing at least one program stored in the memory, wherein the processor is configured to: obtain at least one of topology information and load information, compute a traffic path for each application based on at least one of the topology information and the load information, and generate a routing identification (RID) for each application based on the computed traffic path.

According to an embodiment of the present disclosure, a computer-implemented method using an apparatus for establishing a traffic path and forwarding an established traffic path in a mobile communication system, the method comprising: obtaining at least one of topology information and load information; computing a traffic path for each application based on at least one of the topology information and the load information; and generating a routing identification (RID) for each application based on the computed traffic path.

The present disclosure has an effect of providing a method for establishing a traffic path and forwarding the established traffic path in a mobile communication system.

The present disclosure has an effect of providing a method for establishing a traffic path utilizing URSP and forwarding the established traffic path in a mobile communication system.

The present disclosure has an effect of providing a method for establishing a traffic path based on the NF that calculates and determines a traffic path and forwarding the established traffic path in a mobile communication system.

The technical effects of the present disclosure are not limited to the technical effects described above, and other technical effects not mentioned herein may be understood to those skilled in the art to which the present disclosure belongs from the description below.

BRIEF DESCRIPTION OF THE DRAWINGS

FIGS. 11A and 11B illustrate a method for applying RID during a data transmission process according to an embodiment of the present disclosure.

DETAILED DESCRIPTION

Figure 1:
FIG. 1 is a conceptual drawing illustrating a mobile communication system according to an embodiment of the present disclosure.
Figure 1:
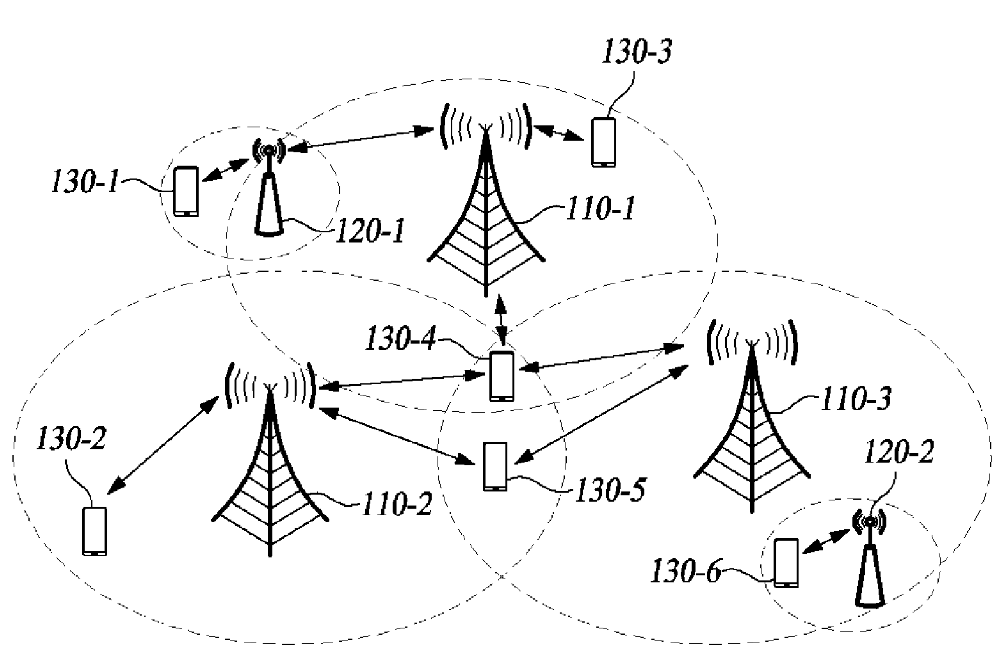

Hereinafter, some embodiments of the present disclosure will be described in detail with reference to the accompanying drawings. In the following description, like reference numerals can designate like elements, even though the elements can be shown in different drawings. Further, the following description of some embodiments can omit, for the purpose of clarity and for brevity, a detailed description of related known components and functions when considered obscuring the subject of the present disclosure.

Various ordinal numbers or alpha codes such as "first", "second", "A", "B", "(a)", "(b)", etc., can be prefixed solely to differentiate one component from the other but not to necessarily imply or suggest the substances, order, or sequence of the components. Throughout this specification, when a part "includes" or "comprises" a component, the part is meant to allow for further including other components and to not exclude other components, unless specifically stated to the contrary. Terms such as "unit," "module," and the like can refer to units in which at least one function or operation is processed and they may be implemented by hardware, software, or a combination thereof.

The following detailed description is intended to describe exemplary embodiments of the present invention and is not intended to represent the only embodiments in which the present invention may be practiced.

A communication network according to embodiments of the present disclosure will be described. Communication networks include non-terrestrial networks (NTNs), 4G communication networks (e.g., long-term evolution (LTE) communication networks), and 5G communication networks (e.g., new radio (NR) communication networks). Also, for example, the next-generation communication network may be, but not limited to, a 6G communication network or a new type of communication network. Throughout the disclosure, a network refers to, for example, the wireless Internet such as WiFi (wireless fidelity), the mobile Internet such as wireless broadband Internet (WiBro) or World interoperability for microwave access (WiMax), the 2G mobile communication network such as global system for mobile communication (GSM) or code division multiple access (CDMA), the 3G mobile communication network such as wideband code division multiple access (WCDMA) or CDMA2000, the 3.5G mobile communication network such as high speed downlink packet access (HSDPA) or high speed uplink packet access (HSUPA), the 4G mobile communication network such as long term evolution (LTE) network or LTE-Advanced network, the 5G mobile communication network known as the NR, and other next-generation communication networks, which may be the 6G communication network or other networks; the network according to the present disclosure is not limited to the specific types mentioned above.

Throughout the disclosure, a terminal refers to a User Equipment (UE), an access terminal, a mobile terminal, a station, a subscriber station, a mobile station, a portable subscriber station, a node, or a device. Throughout the disclosure, the terminal may be referred to as UE, for example.

Here, a terminal may be implemented by a desktop computer, a laptop computer, a tablet personal computer, a wireless phone, a mobile phone, a smart phone, a smart watch, a smart glass, an e-book reader, a portable multimedia player (PMP), a portable game console, a navigation device, a digital camera, digital multimedia broadcasting (DMB) player, a digital audio recorder, a digital audio player, a digital picture recorder, a digital picture player, a digital video recorder, or a digital video player.

Throughout the disclosure, the base station may be referred to as Node B, base transceiver station (BTS), radio base station, radio transceiver, access point, access node, road side unit (RSU), digital unit (DU), cloud digital unit (CDU), radio remote head (RRH), radio unit (RU), transmission point (TP), transmission and reception point (TRP), or a relay node.

FIG. 1 is a conceptual drawing illustrating a mobile communication system according to an embodiment of the present disclosure.

Referring to FIG. 1, the communication system 100 may include a plurality of communication nodes 110-1, 110-2, 110-3, 120-1, 120-2, 130-1, 130-2, 130-3, 130-4, 130-5, 130-6. The plurality of communication nodes may support the 4G communication (e.g., long term evolution (LTE), LTE-Advanced (LTE-A)), 5G communication (e.g., new radio (NR)), and the next-generation communication (e.g., 6G) specified in the 3rd generation partnership project (3GPP) standards. The 4G communication may operate in the frequency bands below 6 GHz, while the 5G communication may extend the frequency bands both below 6 GHz and above 6 GHz. In the realm of 6G communication, Terahertz (THz) frequency bands may be employed, being integrated with artificial intelligence (AI) and other various technologies, with communication not confined to a specific form.

For example, to perform 4G, 5G, and 6G communication, a plurality of communication nodes may support communication protocols based on code division multiple access (CDMA), wideband CDMA (WCDMA), time division multiple access (TDMA), frequency division multiple access (FDMA), orthogonal frequency division multiplexing (OFDM), Filtered OFDM, cyclic prefix (CP)-OFDM, discrete Fourier transform-spread-OFDM (DFT-s-OFDM), orthogonal frequency division multiple access (OFDMA), single carrier-FDMA (SC-FDMA), Non-orthogonal Multiple Access (NOMA), generalized frequency division multiplexing (GFDM), filter bank multi-carrier (FBMC), universal filtered multi-carrier (UFMC), and Space Division Multiple Access (SDMA).

Also, the communication system 100 may further include a core network. If the communication system 100 supports 4G communication, the core network may include a serving-gateway (S-GW), a packet data network (PDN)-gateway (P-GW), a mobility management entity (MME). If the communication system 100 supports 5G communication, the core network may include a user plane function (UPF), a session management function (SMF), and an access and mobility management function (AMF). Also, for example, when the communication system 100 supports 5G communication, the core network may be configured based on a function based on 5G communication or a new function, not limited to a specific form.

Figure 2:
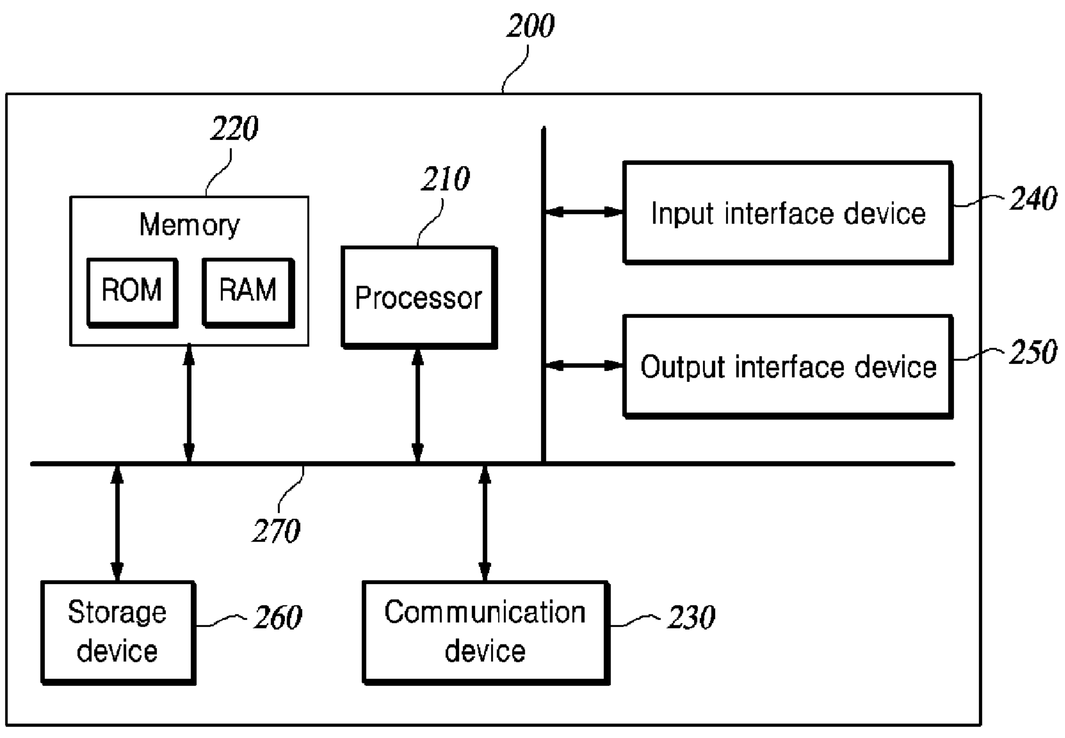
FIG. 2 is a block diagram of a plurality of communication nodes in a mobile communication system according to an embodiment of the present disclosure.

Meanwhile, each of the plurality of communication nodes 110-1, 110-2, 110-3, 120-1, 120-2, 130-1, 130-2, 130-3, 130-4, 130-5, 130-6, or NF constituting the communication system 100 may have a structure as shown in FIG. 2.

FIG. 2 is a block diagram of a plurality of communication nodes in a mobile communication system according to an embodiment of the present disclosure.

Referring to FIG. 2, the communication node 200, NF may include at least one processor 210, a memory 220, and a communication device 230 connected to a network to perform communication. Also, the communication node 200 may further include an input interface device 240, an output interface device 250, and a storage device 260. Individual constituting elements included in the communication node 200 may be interconnected via a bus 270 and perform communication with each other.

However, the constituting elements included in the communication node 200 may be connected through individual interfaces or buses via the processor 210, rather than the common bus 270. For example, the processor 210 may be connected to at least one of the memory 220, the communication device 230, the input interface device 240, the output interface device 250, and the storage device 260 through a dedicated interface.

The processor 210 may execute a program command stored in at least one of the memory 220 and the storage device 260. The processor 210 may refer to a central processing unit (CPU), a graphics processing unit (GPU), or a dedicated processor which performs methods according to embodiments of the present disclosure described with reference to FIGS. 2 to 14. Each of the memory 220 and the storage device 260 may comprise at least one of, for example, a volatile storage medium and a non-volatile storage medium. For example, the memory 220 may comprise at least one of a read only memory (ROM) and a random access memory (RAM).

Referring again to FIG. 1, the communication system 100 may include a plurality of base stations 110-1, 110-2, 110-3, 120-1, 120-2 and a plurality of terminals 130-1, 130-2, 130-3, 130-4, 130-5, 130-6. The communication system 100 comprising the base stations 110-1, 110-2, 110-3, 120-1, 120-2 and the terminals 130-1, 130-2, 130-3, 130-4, 130-5, 130-6 may be referred to as an "access network." Each of the first base station 110-1, the second base station 110-2, and the third base station 110-3 may form a macro cell. Each of the fourth base station 120-1 and the fifth base station 120-2 may form a small cell. The fourth base station 120-1, the third terminal 130-3, and the fourth terminal 130-4 may be included within the cell coverage of the first base station 110-1. The second terminal 130-2, the fourth terminal 130-4, and the fifth terminal 130-5 may be included within the cell coverage of the second base station 110-2. The fifth base station 120-2, the fourth terminal 130-4, and the fifth terminal 130-5, and the sixth terminal 130-6 may be included within the cell coverage of the third base station 110-3. The first terminal 130-1 may be included within the cell coverage of the fourth base station 120-1. The sixth terminal 130-6 may be included within the cell coverage of the fifth base station 120-2.

Here, each of the plurality of base stations 110-1, 110-2, 110-3, 120-1, 120-2 may be referred to as Node B, evolved Node B, gNB, xNB, base transceiver station (BTS), radio base station, radio transceiver, access point, or access node. Each of the plurality of terminals 130-1, 130-2, 130-3, 130-4, 130-5, 130-6 may be referred to as a user equipment (UE), a terminal, an access terminal, a mobile terminal, a station, a subscriber station, a mobile station, a portable subscriber station, a node, or a device.

Meanwhile, each of the plurality of base stations 110-1, 110-2, 110-3, 120-1, 120-2 may operate in different frequency bands or may operate in the same frequency band. Each of the plurality of base stations 110-1, 110-2, 110-3, 120-1, 120-2 may be interconnected through an ideal backhaul link or a non-ideal backhaul link, and information may be exchanged with each other through the ideal backhaul link or the non-ideal backhaul link. Each of the plurality of base stations 110-1, 110-2, 110-3, 120-1, 120-2 may be connected to the core network through the ideal backhaul link or the non-ideal backhaul link. Each of the plurality of base stations 110-1, 110-2, 110-3, 120-1, 120-2 may transmit a signal received from the core network to the corresponding terminal 130-1, 130-2, 130-3, 130-4, 130-5, 130-6 and transmit a signal received from the corresponding terminal 130-1, 130-2, 130-3, 130-4, 130-5, 130-6 to the core network.

Also, for example, the core network of the communication system is built on an architecture based on interaction between NFs. For example, the 5G core (5GC), the core network of the 5G system, may include various entities. Specifically, AMF can manage access and mobility of the terminal. The AMF may perform the functions of non-access stratum (NAS) security management and mobility management for dormant terminals.

The SMF may manage sessions. For example, the SMF may perform the function of allocating Internet protocol (IP) addresses and controlling packet data unit (PDU) sessions.

Also, the policy control function (PCF) may perform the function of controlling policy. Also, the user plane function (UPF) may perform the function of controlling the user plane. To perform the function of a gateway for transmitting and receiving data, the UPF may perform all or part of the user plane function of a serving gateway (S-GW) and a packet data network gateway (P-GW) of previous mobile communication systems (e.g., 4G). Also, the UPF may perform the function of handling PDUs. Also, the application function (AF) may control application functions. The AF may perform the function of providing a plurality of services to a terminal. The unified data management (UDM) may perform the function of managing integrated data. Here, the UDM may perform the function of managing subscriber information.

Also, for example, the core network of the next-generation system (e.g., 6G) may provide the same function of the 5G system and may be referred to by the same name; alternatively, a new entity (or function) based on the next-generation system may be formed, which is not limited to a specific embodiment. However, as described above, the next-generation system may also provide the functions for managing access and mobility of terminals or managing sessions, which may be applied in the same manner to the matters described below. In the following, for the purpose of convenience, descriptions are based on the 5G system, but the present disclosure is not limited to the descriptions and may be equally applied to the next-generation system.

Figure 3:
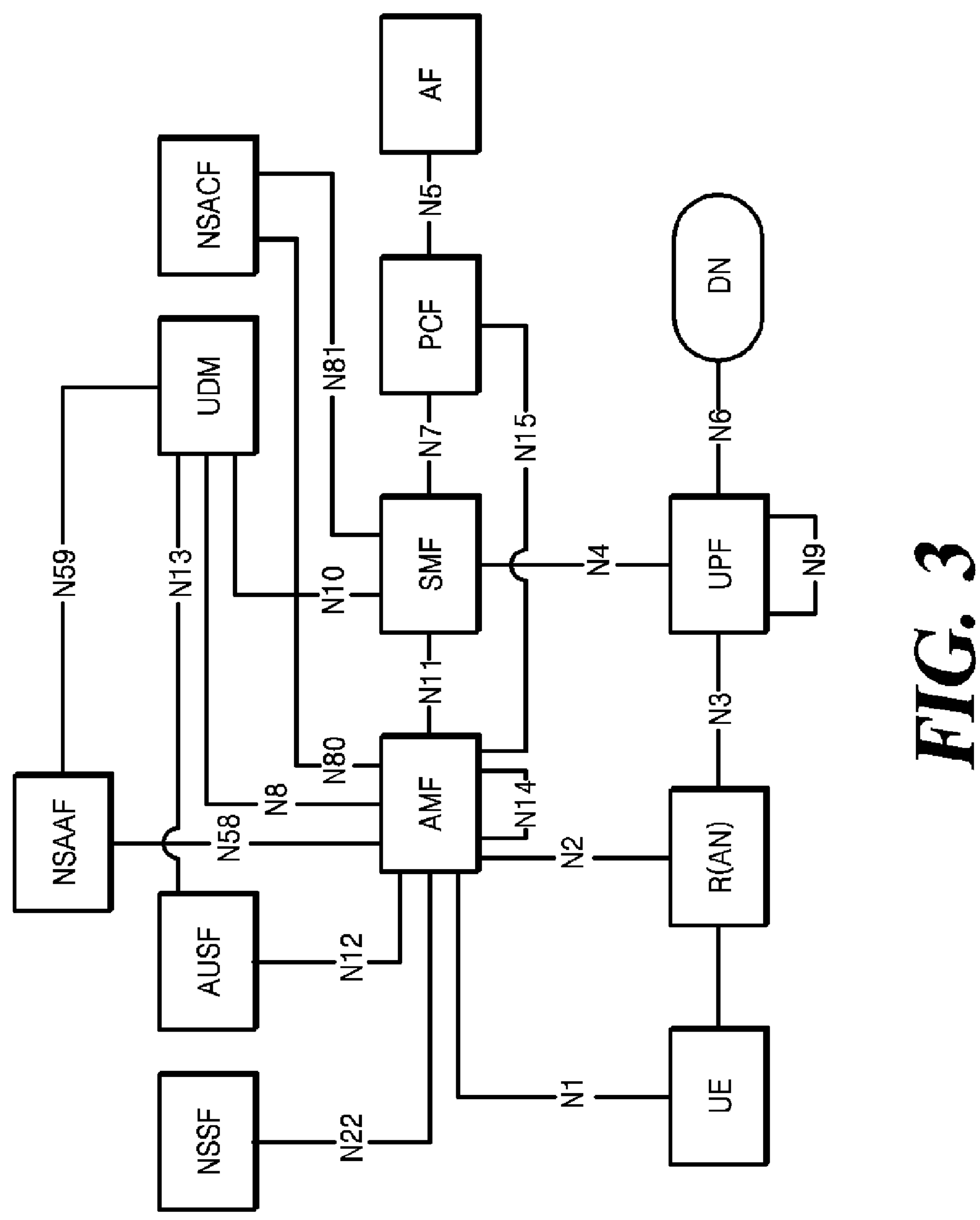
FIG. 3 illustrates reference points according to an embodiment of the present disclosure.

FIG. 3 illustrates reference points according to an embodiment of the present disclosure.

Referring to FIG. 3, a reference point may represent interaction between NF services among NFs specified by a point-to-point reference point between two NFs. For example, N1 may be a reference point between the UE and the AMF. N2 may be a reference point between the (Radio) Access Network ((R)AN) and the AMF. N3 may be a reference point between the (R)AN and the User Plane Function (UPF). Other reference points may be defined as shown in Table 1 but are not limited to the specific definitions.

TABLE 1

| |
|---|
| N1: Reference point between the UE and the AMF. |
| N2: Reference point between the (R)AN and the AMF. |
| N3: Reference point between the (R)AN and the UPF. |
| N4: Reference point between the SMF and the UPF. |
| N5: Reference point between the PCF and an AF or TSN AF. |
| N6: Reference point between the UPF and a Data Network. |
| N7: Reference point between the SMF and the PCF. |
| N8: Reference point between the UDM and the AMF. |
| N9: Reference point between two UPFs. |
| N10: Reference point between the UDM and the SMF. |
| N11: Reference point between the AMF and the SMF. |
| N12: Reference point between AMF and AUSF. |
| N13: Reference point between the UDM and Authentication Server function the AUSF. |
| N14: Reference point between two AMFs. |
| N15: Reference point between the PCF and the AMF in the case of non-roaming scenario, PCF in the visited network and AMIF in the case of roaming scenario. |
| N16: Reference point between two SMFs, (in roaming case between SMF in the visited network and the SMF in the home network). |
| N16a: Reference point between SMF and I-SMF. |
| N17: Reference point between AMF and 5G-EIR. |
| N18: Reference point between any NF and UDSF. |
| N19: Reference point between two PSA UPFs for 5G LAN-type service. |
| N22: Reference point between AMF and NSSF. |

Figure 4:
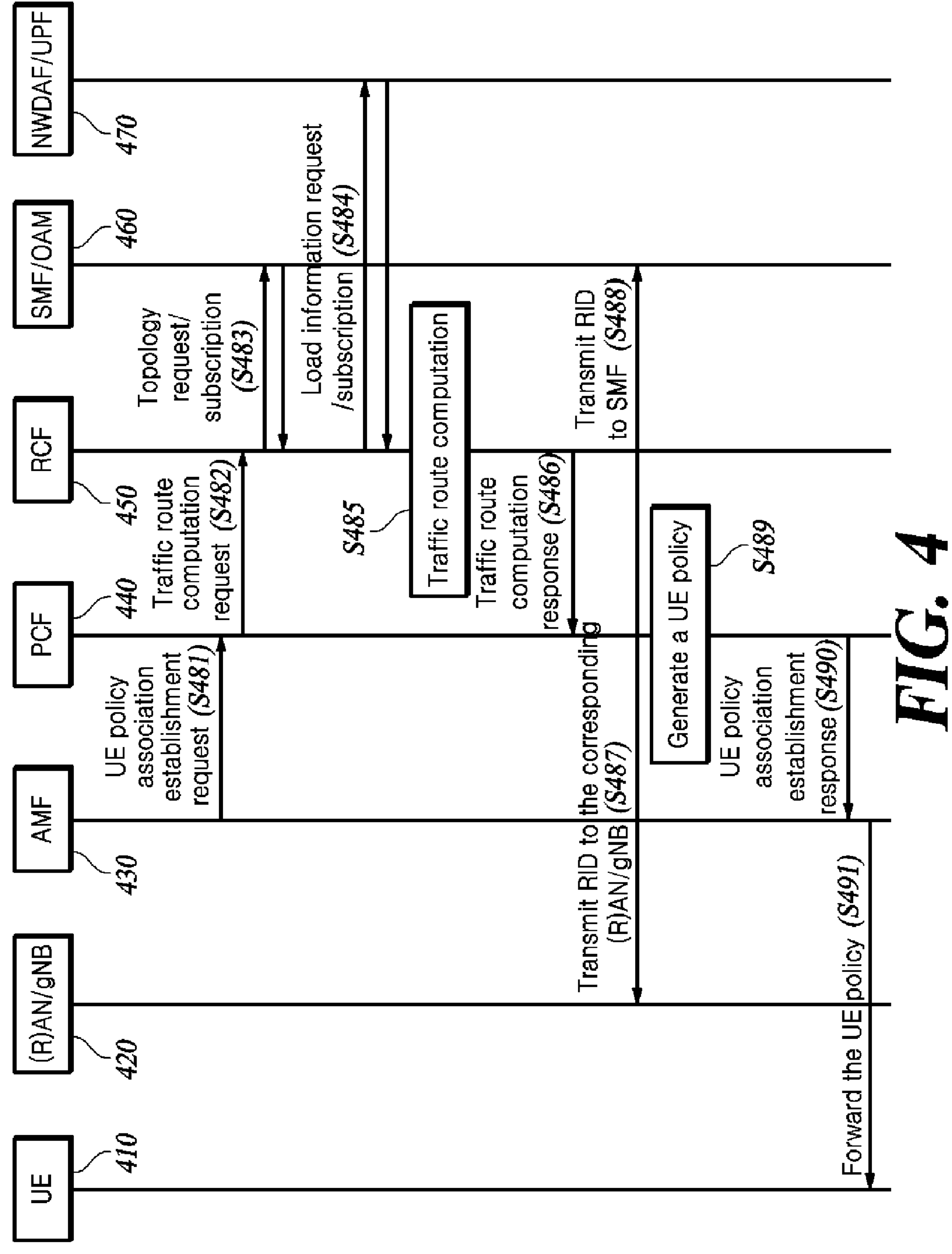
FIG. 4 is a flow diagram illustrating a method for establishing a traffic path utilizing URSP and forwarding the established traffic path according to an embodiment of the present disclosure.

FIG. 4 is a flow diagram illustrating a method for establishing a traffic path utilizing URSP and forwarding the established traffic path according to an embodiment of the present disclosure.

Referring to FIG. 4, the AMF 430 may forward a UE policy association establishment request message to the PCF 440 in the step 481. For example, the UE 410 may be connected to a network and receive a service. The UE 410 may transmit a registration request message to the base station 420, and the base station 420 may select the AMF 430 to register the UE to the network. After being connected to the network, the UE 410 may forward UE service requirements and policy-related information to the AMF 430, and the AMF 430 may forward the UE policy association establishment request message to the PCF 440 based on the UE service requirements and policy-related information.

Specifically, the UE policy association establishment request message may include subscription data and UE context information. Here, the subscription data may include parameter information related to other UE services, such as Quality of Service (QOS) profile, service priority, multimedia priority service (MPS) priority, and mission critical service (MCX) priority. Also, for example, the subscription data may further include information related to the following operations, which may not be limited to a specific form. For example, the QoS profile may be a profile indicating QoS requirements for a service to which the UE has subscribed and may include data rate, delay time, packet error rate, and other information based on the characteristics of the service to which the UE has subscribed. Also, service priority is priority information for services to which the UE has subscribed and may be used to recognize the priority of the corresponding service among a plurality of services. Also, the priority of multimedia data may be recognized through the MPS priority, and priority information for a mission critical service to which the UE has subscribed may be recognized through the MCX priority. Also, the UE policy association establishment request message may include UE context information. For example, UE context information may include at least one of subscriber permanent identifier (SUPI), access type, permanent equipment identifier (PEI), group permanent subscription identifier (GPSI), UE location information, UE time zone, serving network, radio access technology (RAT) type, UE access selection, PDU session selection policy, and other information, which is not limited to a specific form. In other words, when the AMF 430 requests the PCF 440 to generate a UE policy, the AMF 430 may forward the information above to enable the PCF 440 to generate a UE policy.

The PCF 440 may check the UE service requirements and policy-related information through the UE policy association establishment request message and generate a UE policy. For example, the UE policy may include a policy for establishing a connection between the UE and a service provider, which is not limited to a specific form.

Here, when the PCF 440 receives a UE policy association establishment request message, the PCF 440 may obtain traffic path information for each service. For example, the PCF 440 may forward a traffic route computation request message to the routing control function (RCF) 450 in the step 482. Here, the RCF 450 may be an NF that generates an optimal data (or traffic) path, which may not be limited to the specific name. For example, an NF that performs the same function as the RCF 450 may be defined with a different name. Also, the RCF may be an individual network function but is not limited to the specific form. For example, the RCF may be combined with another NF or may be included in another NF. In the following, for the convenience of descriptions, each NF is assumed to be the RCF but is not limited to the specific assumption.

When the RCF 450 receives the traffic route computation request message, the RCF 450 may obtain topology information by forwarding a topology request message to the SMF/OAM (operation, administration, and maintenance) 460 in the step 483. Also, the RCF 450 may obtain changed topology information from the SMF/OAM 460 when the topology information changes through subscription. Also, the RCF 450 may obtain load information by forwarding a load information request message to the network data analytics function (NWDAF)/UPF 470 in the step 484. Also, the RCF 450 may obtain changed load information from the NWDAF/UPF 470 when the load information changes through subscription. More specifically, the RCF 450 may obtain load information and load analysis/prediction information from the NWDAF through request and subscription. Since the NWDAF performs the function of collecting and analyzing load information, the RCF 450 may obtain both load information and load analysis/prediction information from the NWDAF. On the other hand, the RCF 450 may obtain load information from the UPF. Since the UPF forwards only its own measurement information, the RCF 450 may obtain load information from the UPF.

Here, the SMF may be an NF that manages sessions for services in a network, through which a UE may receive a service. Also, the OAM may be an NF that performs operation, management, and maintenance in the network, supporting monitoring the network and identifying and resolving problems. Based on the operation above, the SMF/OAM 460 may recognize the topology established based on the path through which traffic is forwarded, and the RCF 450 may obtain the topology information by requesting the corresponding information from SMF/OAM 460.

The NWDAF may be an NF that improves service quality by collecting and analyzing data and optimizing network resources based on the analyzed data. The NWDAF may forward a result from the analyzed data to other NFs. Also, the UPF may be an NF that transmits user data in the network. The UPF may transmit and process data packets and may maintain data transmission performance and ensure stability through QoS management. Based on the operation above, the RCF 450 may obtain load information and load analysis/prediction information from the NWDAF. Also, the RCF 450 may obtain load information from the UPF.

Then, the RCF 450 may calculate a traffic path based on at least one of the obtained topology information, obtained load information, and other information in the step 485; and forward a traffic route computation response message that includes the traffic path information calculated to the PCF 440 in the step 486. Here, for example, a traffic path may be generated for each application, and a routing identification (RID) corresponding to the traffic path generated for each application may be assigned. After calculating the traffic path, the RCF 450 may forward the RID corresponding to the traffic path generated for each application to the base station 420 in the step 487, through which the base station 420 may recognize the traffic path. In other words, the RCF 450 may forward RID information to the base station 420, and the base station 420 may acquire the RID information from the RCF 450 and establish a forwarding information base (FIB)/routing information base (RIB). Also, the RCF 450 may forward RID information corresponding to the traffic path generated for each application to the SMF in the step 488. For example, when the SMF and the UPF perform the N4 session establishment procedure or the N4 session modification procedure, the SMF may forward the traffic path to the UPF based on the obtained RID information, through which the UPF may recognize the traffic path information.

The step 487 and the step 488 may operate simultaneously, or the step 488 may precede the step 487, where the sequency of operations is not limited to a particular order.

The PCF 440 may generate a UE policy by reflecting the obtained traffic path information in the step 489, and forward the UE policy information included in the UE policy association establishment response to the AMF 430 in the step 490. Afterward, the AMF 430 may forward the corresponding UE policy information to the UE 410 in the step 491. Here, the UE policy information may be RID information corresponding to the traffic path generated for each application, and the UE 410 may recognize the traffic path established for each application through the RID. In other words, the UE policy information may include RID information without information on the traffic path itself.

Figure 5:
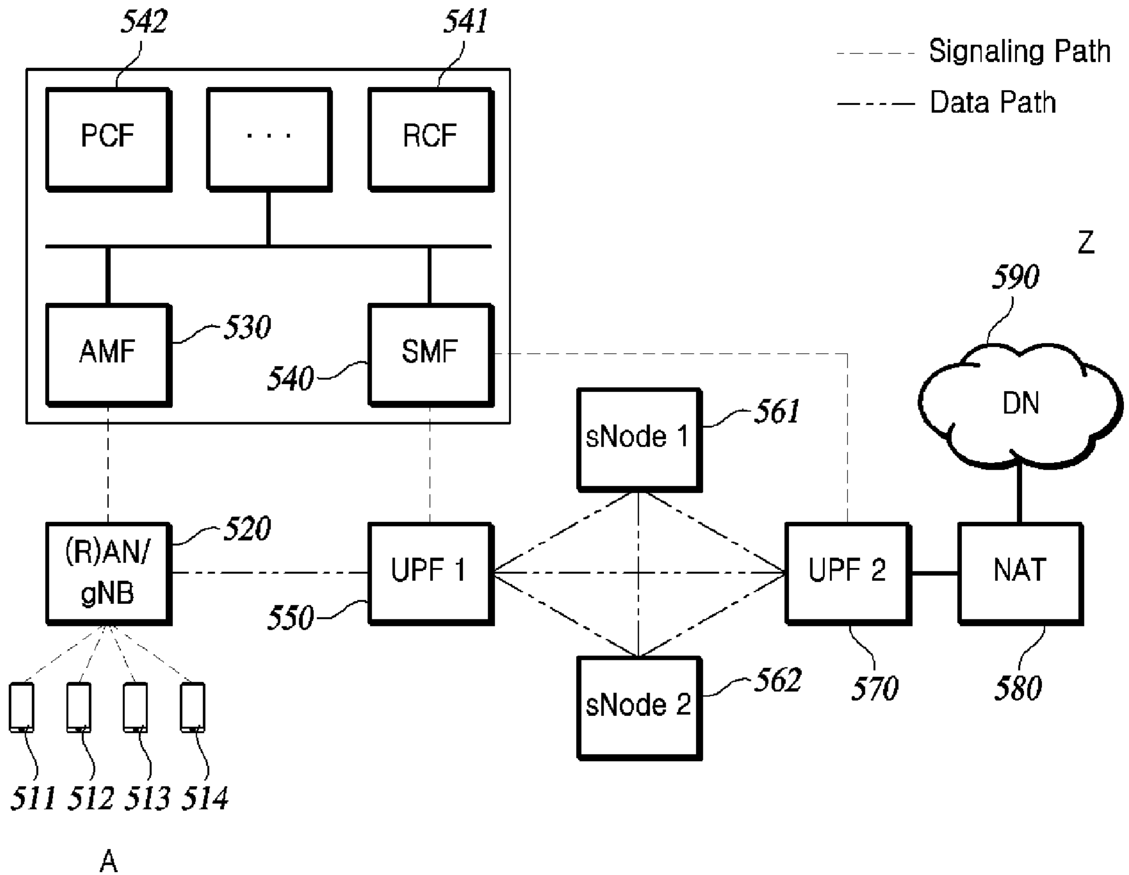
FIG. 5 illustrates a method for establishing a traffic path in a mobile communication system according to an embodiment of the present disclosure.

FIG. 5 illustrates a method for establishing a traffic path in a mobile communication system according to an embodiment of the present disclosure.

For example, the network of the mobile communication system may generate a protocol data unit (PDU) session based on the GPRS tunneling protocol (GTP) and then forward user data to the data network. Here, the IP packet sent by the UE 511, 512, 513, 514 (node address A) may be forwarded through a GTP-based PDU session based on the GTP tunnel formed by the base station 520 and at least one UPF 550, 570 regardless of the destination IP address of the IP packet. For example, referring to FIG. 5, a GTP-based PDU session may forward packets to the network address translation (NAT) 580 through a fixed GTP tunnel formed along UPF 1 550 and UPF 2 570 using at least one UPF. After receiving the packet, the NAT 580 may convert the destination of the received packet into the destination IP address of the IP packet originally set by the UE and forward the packet to the data network (DN) 590 (node address Z). Here, a GTP-based PDU session may be provided through a fixed path from the base station 520 to UPF 2 570. For example, when packet transmission is performed based on the GTP-based PDU session, per-session tunnel establishment may be required for all nodes, which may result in increased complexity for the user plane. In another example, since tunnel establishment per session is required for all modes within the fixed route, multiple tunnels may be required, and other protocol-based operations may also operate based on the fixed route described above, which may lead to the problem of increased complexity. Here, at least one or more UEs 511, 512, 513, 514 may be connected to the base station 520. Access and mobility of at least one or more UEs 511, 512, 513, 514 may be controlled by the AMF 530. Also, a GTP-based PDU session generated based on tunneling between the base station 520 and the UPF 570 may be controlled by the SMF 540. The SMF 540 may select the UPF 550, 570 to be used by at least one or more UEs 511, 512, 513, 514.

As a specific example, the UE may perform radio resource control (RRC) connection to connect to the network. Afterward, the UE may transmit a PDU session establishment request message to the AMF 530 to establish a PDU session. A PDU session establishment request may include various pieces of configuration information for establishing a PDU session. For example, a PDU session establishment request may include PDU session type, QoS information, and other information, which is not limited to a specific form. After receiving the PDU session establishment request message, the AMF 530 may perform authentication and registration for the UE and select the SMF 540. The AMF 530 may select the SMF 540 based on the type of service used by the UE, QOS requirements, and other factors. After the SMF 540 is selected, the AMF 530 may transmit a request message for creation of session management (SM) context to the SMF 540 and receive a response message to complete the establishment of the PDU session. For example, the SM context may include information for a PDU session, a PDU session identifier, security and encryption settings for the PDU session, QoS information, and other information. The SMF 540 may obtain subscription information from the UDM, generate SM context, and provide a response message to the AMF 530. The SMF 540 may then perform PCF selection and establish or modify SM policy association based on the policy of the selected PCF. Afterward, the SMF 540 may select the UPF 550, 570 and establish a session (N4 session) with the UPF 550, 570. Afterward, the SMF 540 may perform message exchange with the AMF 530, the AMF 530 may transmit a request message for establishing a session (N2 session) with the base station 520, and the base station 520 may transmit a response message for session establishment to the AMF 530 after exchanging information for a PDU session establishment with the UE. The response message may include (R)AN GTP-U tunnel endpoint information. Based on the operation above, a PDU session for uplink may be established. When uplink data is generated, the UE may transmit the data to the base station 520, and the base station 520 may transmit packets to the UPF 550, 570 based on a GTP-based PDU session. Afterward, the AMF 530 may transmit a request message for update of SM context to the SMF 540 and receive a response message in response to the transmission. The SMF 540 may forward (R)AN GTP-U tunnel endpoint information and other information for downlink transmission to the UPF 550, 570 along with an N4 session modification request. Afterward, the SMF 540 may receive an N4 session modification response message, and when downlink data is generated, the packet may be transmitted to the UE through the UPF 550, 570. However, the GTP-based PDU session may be a static, fixed route based on the selected route as described above.

For example, segment routing IPV6 (SRv6) may be applied between the access network and the UPFs. Here, SRv6 may be supported for both the access network and the core network. As another example, SRv6 may be applied only to the core network but not applied to the access network, where the present disclosure is not limited to the specific embodiment.

When an SRv6-based session is established according to an embodiment of the present disclosure instead of the GTP-based tunnel, a dynamic path may be established for each application. For example, a PDU session may be generated and transmitted based on the SRv6.

Here, because SRv6 supports source routing technology, a path consisting of UPFs 550, 570 or nodes 561, 562 suitable for the characteristics of user data within the core network may be provided to application services. For example, a node may be a UPF, a server, or an entity of a different type, which is not limited to a specific type. As a specific example, a source node (e.g., 520, 570) may select a route and encode route information in a packet header. Here, the segment routing header may include an IPV6 segment list based on IPV6, and the packet may be forwarded from the source node to the IPV6 destination node along the node corresponding to each segment list based on the route information. For example, an SRv6 segment may be identified through a segment identifier (SID) encoded according to the IPV6. For example, the RID described above may be the same as the SID or may be an identifier configured based on the SID, which will be described later.

For example, after creating a PDU session based on the SRv6, user data may be forwarded to the data network, and the SRv6-based PDU session may be dynamically set to various paths. The SRv6-based PDU session may include a case where a session is established based on SRv6. As another example, the SRv6-based PDU session may include a case where the GTP-based PDU session is not generated and packets are transmitted based on IP between nodes, where the present disclosure is not limited to a specific embodiment. However, for the convenience of descriptions, it is assumed that an SRv6-based PDU session is generated.

The SRv6-based PDU sessions may set dynamic paths differently from the GTP-based PDU sessions. For example, an SRv6-based PDU session may be established between the base station 520 and UPF 1 550, between UPF 1 550 and sNode 1 561, and between sNode 1 561 and UPF 2 570 for a specific packet. Through the established session, a specific packet may be forwarded to the DN 590 along the path. On the other hand, an SRv6-based PDU session may be established between the base station 520 and UPF 1 550, between UPF 1 550 and sNode 2 562, and between sNode 2 562 and UPF 2 570 for other specific packets. Through the established session, other specific packets may be forwarded to the DN 590 along the path. In other words, each packet may be delivered to the DN 590 through a different path. Here, for example, the path for each packet may be determined differently based on the packet type or service. Also, each node may be a server or an UPF, and each node may perform different operations. For example, a specific node may be a security server that verifies packets, and another specific node may be a server that takes encoding or decoding operations into account, where the present disclosure is not limited to the specific example. In other words, packets may be forwarded along a path comprising nodes corresponding to the packet type or service. Here, SRv6 may support a dynamic route as described above through the IPV6-based route establishment; since the GTP tunnel forwards packets through a fixed PDU session, the dynamic route establishment described above may not be possible.

For example, a path may be established dynamically for traffic based on the SRv6 as described above. Here, path establishment for traffic may be set for each application (or service). In other words, a UE may transmit and receive data through different traffic paths for the respective services or applications. Through the operation above, the UE may use a traffic path established in consideration of the characteristics of the service or application, and accordingly, transmission suitable for each service or application may be performed. For example, the RCF 541 may calculate a traffic path based on at least one of topology information, load information, and other information, which is the same as described above. Here, the RCF 541 may generate a traffic path for each application and return an RID corresponding to the generated traffic path, and the RID may be forwarded to the PCF 542 and the base station 520. Also, the RCF 541 may forward RID information corresponding to each traffic path generated for each application to the SMF 540. For example, when the SMF and the UPF perform the N4 session establishment procedure or the N4 session modification procedure, the SMF may forward a traffic path to the UPF based on the obtained RID information, and the UPF may recognize the traffic path through the obtained RID information.

Table 2 below shows a specific example of the RID returned by the RCF 541 for each application; however, the example is shown only for the convenience of description, and the present disclosure is not limited to the specific example. Specifically, the RCF 541 may calculate a traffic path and forward packets for application 1 along the path of the "base station 520-UPF 1 550-sNode 1 561-UPF 2 570" based on RID 1. The RCF 541 may forward RID 1 to PCF 542 and the base station 520. Also, the RCF 541 may forward RID 1 to the SMF 540. For example, when the SMF 540 and UPF 1 550 perform the N4 session establishment procedure or N4 session modification procedure, the SMF 540 may provide a traffic path to UPF 1 550 based on the obtained RID information for each application, and UPF 1 550 may recognize a traffic path information through the provided traffic path. When the base station 520 receives a packet for application 1 from the UE based on RID 1, the base station 520 may forward the packet through the path described above. Also, for example, the RCF 541 may calculate a traffic path and forward packets for application 2 along the path comprising the "base station 520-UPF 1 550-UPF 2 570" based on RID 2. The RCF 541 may forward RID 2 to PCF 542 and the base station 520. Also, the RCF 541 may forward RID 2 to the SMF 540. When the base station 520 receives a packet for application 2 from the UE based on RID 2, the base station 520 may deliver the packet through the path described above. In other words, a different traffic path may be set for each application; the RCF 541 may calculate a traffic path, generate a traffic path for each application, and return the RID corresponding to the traffic path to establish and forward a path for each application (or service).

TABLE 2

| |
|---|
| App1: RID 1, G1 - U1 - S1 - U2 |
| App2. RID 2, G1 - U1 - U2 |
| App3: RID 3, G1 - U1 - S1 - S2 - U2 |
| App4: RID 4, G1 - U1 - S2 - U2 |

As described above, when the base station 520 obtains RID information from the RCF 541, the base station may configure FIB/RIB. Also, the PCF 542 may obtain RID information for each application as traffic path information from the RCF 541. Afterward, when the PCF 542 generates a UE policy, the PCF 542 may reflect the traffic path information. Table 3 below shows an example of a UE route selection policy (URSP) as a UE policy generated in the PCF 542; the example is shown only for the convenience of description, and the present disclosure is not limited to the specific example. Here, for example, URSP may be a policy on how to determine routing of traffic transmitted by the UE. The UE may determine, through the URSP, whether to transmit traffic to an already established PDU session, whether to transmit traffic by offloading to non-3GPP access outside of the PDU session, whether to transmit traffic via the ProSe Layer-3 UE-to-Network Relay outside of the PDU session, or whether to transmit traffic by establishing a new PDU session. In other words, the URSP may be a policy on how the UE determines a traffic path.

Here, for example, the URSP may further include the RID information as a policy related to route selection; Table 3 may be one example of using the RID information.

TABLE 3

| |
|---|
| URSP rule precedence = 1 |
| Traffic descriptor: APP1, DNN, IP 3tuples, . . . |
| RSD: Network Slice Selection; |
| Route Selection (RID 1, G1 - U1 - S1 - U2) |
| URSP rule precedence = 2 |
| Traffic descriptor: APP3 |
| RSD: Route Selection (RID 3, G1 - U1 - S1 - S2 - U2) |

Here, although the description above is based on the application identifier, the present disclosure is not limited to the specific description. For example, the traffic descriptor is part of the URSP traffic descriptor in Table 4 below in addition to the application identifier, which may be composed of Application, IP, Domain, Non-IP descriptors, DNN, or Connection Capabilities. As another example, other types of traffic descriptors may be considered, which may not be limited to a specific type.

TABLE 4

| Information name | Description | Category | PCF permitted to modify in a UE context | Scope |
|---|---|---|---|---|
| Rule Precedence | Determines the order the URSP rule is enforced in the UE. | Mandatory (NOTE 1) | Yes | UE context |
| Traffic descriptor | This part defines the Traffic descriptor components for the URSP rule. | Mandatory (NOTE 3) | | |
| Application descriptors | It consists of OSId and OSAppId(s). (NOTE 2, NOTE 8). | Optional | Yes | UE context |
| IP descriptors (NOTE 6) | Destination IP 3 tuple(s) (IP address or IPv6 network prefix, port number, protocol ID of the protocol above IP) (NOTE 8). | Optional | Yes | UE context |
| Domain descriptors | FQDN(s) or a regular expression which are used as a domain name matching criteria (NOTE 7, NOTE 8). | Optional | Yes | UE context |
| Non-IP descriptors (NOTE 6) | Descriptor(s) for destination information of non-IP traffic (NOTE 8). | Optional | Yes | UE context |
| DNN | This is matched against the DNN information provided by the application (NOTE 8). | Optional | Yes | UE context |
| Connection Capabilities | This is matched against the information provided by a UE application when it requests a network connection with certain capabilities. (NOTE 4, NOTE 8) or traffic categories (NOTE 5). | Optional | Yes | UE context |
| List of Route Selection Descriptors | A list of Route Selection Descriptors. The components of a Route Selection Descriptor are described in table 6.6.2.1-3. | Mandatory | | |

Also, for example, a route selection descriptor may be established based on the URSP rule. Here, when separate routes are established based on RIDs different for each application as described above, additional settings for route selection may be added to the route selection descriptor as shown in Table 5 below. Specifically, when traffic matching an application is transmitted through one of a plurality of routes, route selection may be the setting indicating the corresponding route, which may be configured as shown in Table 6 below.

In other words, the route selection of Table 3 may be reflected in the route selection descriptor as the URSP rule. Here, it should be noted that Tables 5 and 6 are only examples; settings may be added with different names and may not be limited to the corresponding names and descriptions. In other words, when a plurality of traffic paths are available, settings for indicating a specific path may be added, which may not be limited to the following form.

TABLE 5

| Information name | Description | Category | PCF permitted to modify in URSP | Scope |
|---|---|---|---|---|
| Route Selection Descriptor Precedence | Determines the order in which the Route Selection Descriptors are to be applied. | Mandatory (NOTE 1) | Yes | UE context |
| Route selection components | This part defines the route selection components | Mandatory (NOTE 2) | | |
| SSC Mode Selection | One single value of SSC mode. (NOTE 5) | Optional | Yes | UE context |
| Network Slice Selection | Either a single value of a list of values of S-NSSAI(s) | Optional (NOTE 3) | Yes | UE context |
| DNN Selection | Either a single value or a: list of values of DNN(s). | Optional | Yes | UE context |
| PDU Session Type Selection | One single value of PDU Session Type | Conditional (NOTE 8) | Yes | UE context |
| Non-Seamless Offload indication | Indicates if the traffic of the matching application is to be offloaded to non-3GPP access outside of a PDU Session. | Optional (NOTE 4) | Yes | UE context |
| . . . | . . . | . . . | . . . | . . . |
| Route selection | Indicates the route of the traffic if the traffic of the matching application is to be transferred the route among a plurality of routes. Traffic Route with RID | Optional | Yes | UE context |

TABLE 6

| Example URSP rules | | Comments |
|---|---|---|
| Rule Precedence = 1<br>Traffic Descriptor: Application descriptor = App1 | Route Selection Descriptor Precedence = 1<br>Network Slice Selection: S-NSSAI-a<br>SSC: Mode Selection: SSC Mode 3<br>DNN Selection: internet<br>Access Type preference: 3GPP access<br>Route selection: RID 1 | This URSP rule associates the traffic of application "App1" with S-NSSAI-a, SSC Mode 3, 3GPP access and the "internet" DNN. It enforces the following routing policy: The traffic of App1 should be transferred on a PDU Session supporting S-NSSAI-a, SSC Mode 3 and DNN = internet over 3GPP access. If this PDU Session is not established, the UE shall attempt to establish a PDU Session with S-NSSAI-a, SSC Mode 3 and the "internet" DNN over 3GPP access. The traffic of App 1 should be transferred based on RID 1. |
| . . . | . . . | . . . |

As another example, route selection may further include traffic path information in addition to the RID, as shown in Table 7, which will be described later.

TABLE 7

| Example URSP rules | | Comments |
|---|---|---|
| Rule Precedence = 1<br>Traffic Descriptor: Application descriptor = App1 | Route Selection Descriptor Precedence = 1<br>Network Slice Selection: S-NSSAI-a<br>SSC Mode Selection: SSC Mode 3<br>DNN Selection: internet<br>Access Type preference: 3GPP access<br>Route selection: RID 1 (Traffic route 1)<br>e.g. Route selection: RID 1 G1-U1-S1-U2 | This URSP rule associates the traffic of application "App1" with S-NSSAI-a, SSC Mode 3, 3GPP access and the "internet" DNN.<br>It enforces the following routing policy: The traffic of App1 should be transferred on a PDU Session supporting S-NSSAI-a, SSC Mode 3 and DNN = internet over 3GPP access. If this PDU Session is not established, the UE shall attempt to establish a PDU Session with S-NSSAI-a, SSC Mode 3 and the "internet" DNN over 3GPP access. The traffic of App 1 should be transferred based on RID 1. |
| . | . | . |
| . | . | . |
| . | . | . |

Figure 6:
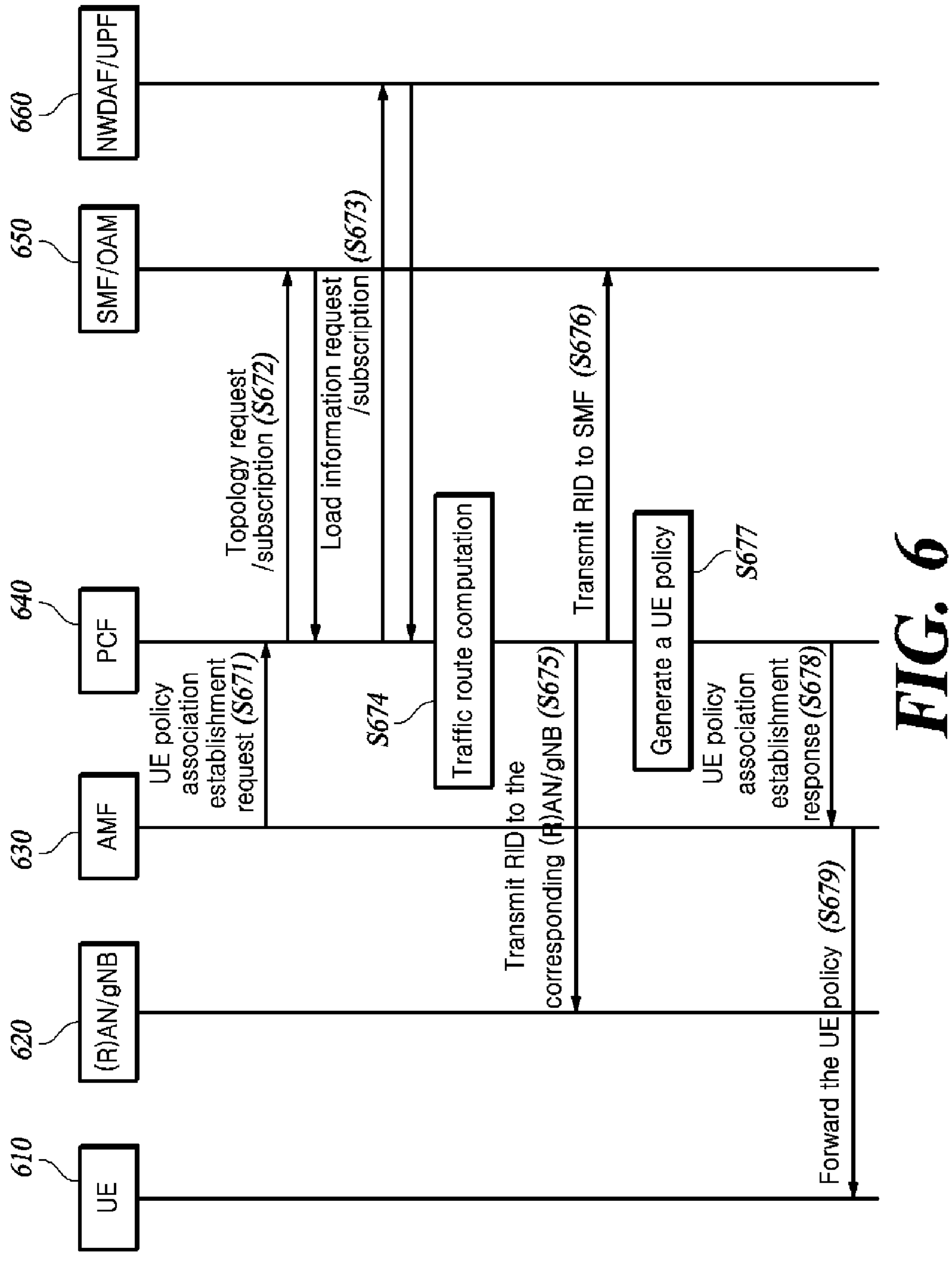
FIG. 6 is a flow diagram illustrating a method for calculating a traffic path by PCF according to an embodiment of the present disclosure.
Figure 7:
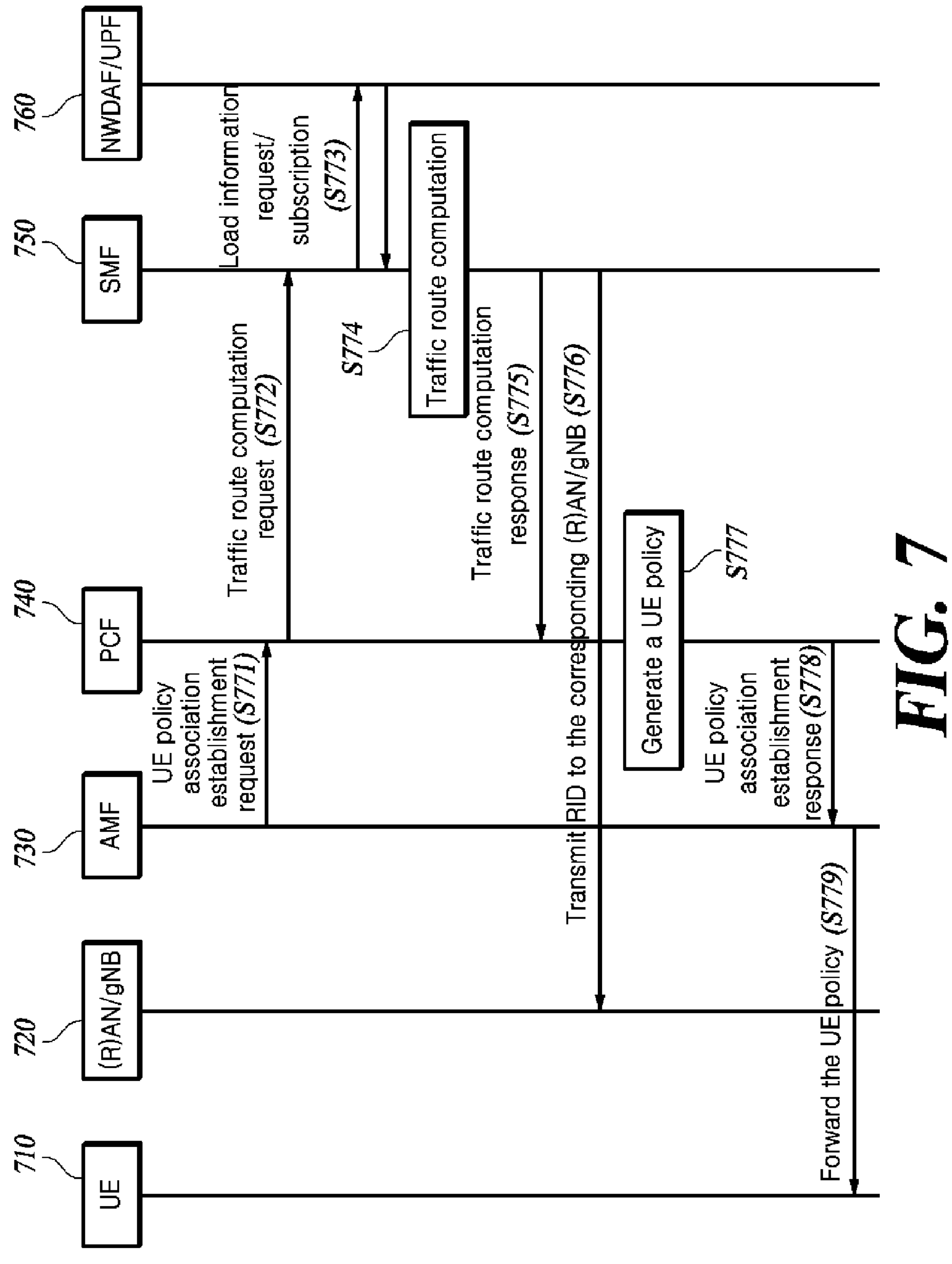
FIG. 7 is a flow diagram illustrating a method for calculating a traffic path by SMF according to an embodiment of the present disclosure.

FIG. 6 is a flow diagram illustrating a method for calculating a traffic path by PCF according to an embodiment of the present disclosure, and FIG. 7 is a flow diagram illustrating a method for calculating a traffic path by SMF according to an embodiment of the present disclosure.

The RCF may be an NF that controls the traffic path. Here, for example, RCF may operate as part of another NF instead of operating independently as a standalone NF. As a specific example, referring to FIG. 6, the PCF 640 may receive a UE policy association establishment request message from the AMF 630 in the step 671. Here, PCF 640 may include the RCF functionality. In other words, the PCF 640 may calculate the traffic path, generate a traffic path for each application, and return the corresponding RID. Also, the PCF 640 may request and receive topology information from the SMF/OAM 650 in the step 672. Also, when the topology information changes through subscription, the PCF 640 may obtain the changed topology information from the SMF/OAM 650. Also, the PCF 640 may request and obtain load information from the NWDAF/UPF 660 in the step 673. Also, when the load information is changed through subscription, the PCF 640 may obtain the changed load information from the NWDAF/UPF 660. More specifically, the PCF 640 may obtain load information and load analysis/prediction information from the NWDAF through request and subscription. Since the NWDAF performs the function of collecting and analyzing load information, the PCF 640 may obtain not only the load information but also the load analysis/prediction information from the NWDAF. On the other hand, the PCF 640 may obtain load information from the UPF. Since the UPF forwards only its own measurement information, the PCF 640 may obtain load information from the UPF.

Afterward, the PCF 640 may calculate a traffic path based on at least one of the topology information, load information, and other information, generate a traffic path for each application and return an RID corresponding to the traffic path, and generate a UE policy in the step 674. For example, the PCF 640 may transmit the RID to the base station 620 in the step 675 as shown in FIG. 4, and the base station 620 may configure the FIB/RIB based on the received RID, which is the same as described above. Also, the PCF 640 may forward the RID to the SMF in the step 676, as shown in FIG. 4. For example, when the SMF and the UPF perform the N4 session establishment procedure or the N4 session modification procedure, the SMF may forward the traffic path to the UPF based on the obtained RID information for each application, through which the UPF may recognize the traffic path information.

Also, the PCF 640 may generate a UE policy by reflecting the obtained traffic path information in the step 677 and forward the UE policy association response message that includes the generated UE policy information to the AMF 630 in the step 678; afterward, the AMF 630 may forward the UE policy information to the UE 610 in the step 679. Here, the UE policy information may be RID information corresponding to the traffic path generated for each application, and the UE 610 may recognize the traffic path established for each application through the RID. In other words, the UE policy information may include RID information without information on the traffic path itself.

As another example, referring to FIG. 7, the PCF 740 may receive a UE policy association establishment request message from the AMF 730 in the step 771. Here, SMF 750 may include the RCF functionality. In other words, the SMF 750 may calculate the traffic path, and the PCF 740 may forward the traffic route computation request message to the SMF 750 in the step 772. Afterward, the SMF 750 may request and obtain load information from the NWDAF/UPF 760 in the step 773. Also, when load information is changed through subscription, the SMF 750 may obtain the changed load information from the NWDAF/UPF 760. More specifically, the SMF 750 may obtain load information and load analysis/prediction information from the NWDAF through request and subscription. Since the NWDAF performs the function of collecting and analyzing load information, the SMF 750 may obtain not only the load information but also the load analysis/prediction information from the NWDAF. On the other hand, the SMF 750 may obtain load information from the UPF. Since the UPF forwards only its own measurement information, the SMF 750 may obtain load information from the UPF.

Also, for example, since the SMF 750 already recognizes the topology information, the SMF 750 may calculate a traffic path based on the obtained load information in the step 774. As another example, the SMF 750 may request and obtain topology information from an OAM not shown in FIG. 7 or obtain changed topology information through subscription. Afterward, the SMF 750 may calculate a traffic path based on the obtained load information and other information. Afterward, the SMF 750 may forward a traffic route computation response message to the PCF 740 in the step 775. Here, the traffic route computation response may include RID information corresponding to the traffic path generated for each application. Also, the SMF 750 may transmit the RID to the base station 720 in the step 776, and the base station 720 may configure the FIB/RIB based on the received RID, which is the same as described above. Also, the PCF 740 may generate a UE policy based on the received traffic route computation information in the step 777. Afterward, the PCF 740 may forward a generated UE policy association response message containing the UE policy information to the AMF 730 in the step 778, and the AMF 730 may forward the UE policy information to the UE 710 in the step 779. Here, the UE policy information may be RID information corresponding to the traffic path generated for each application, and the UE 410 may recognize the traffic path established for each application through the RID. In other words, UE policy information may include RID information without information on the traffic path itself.

Figure 8:
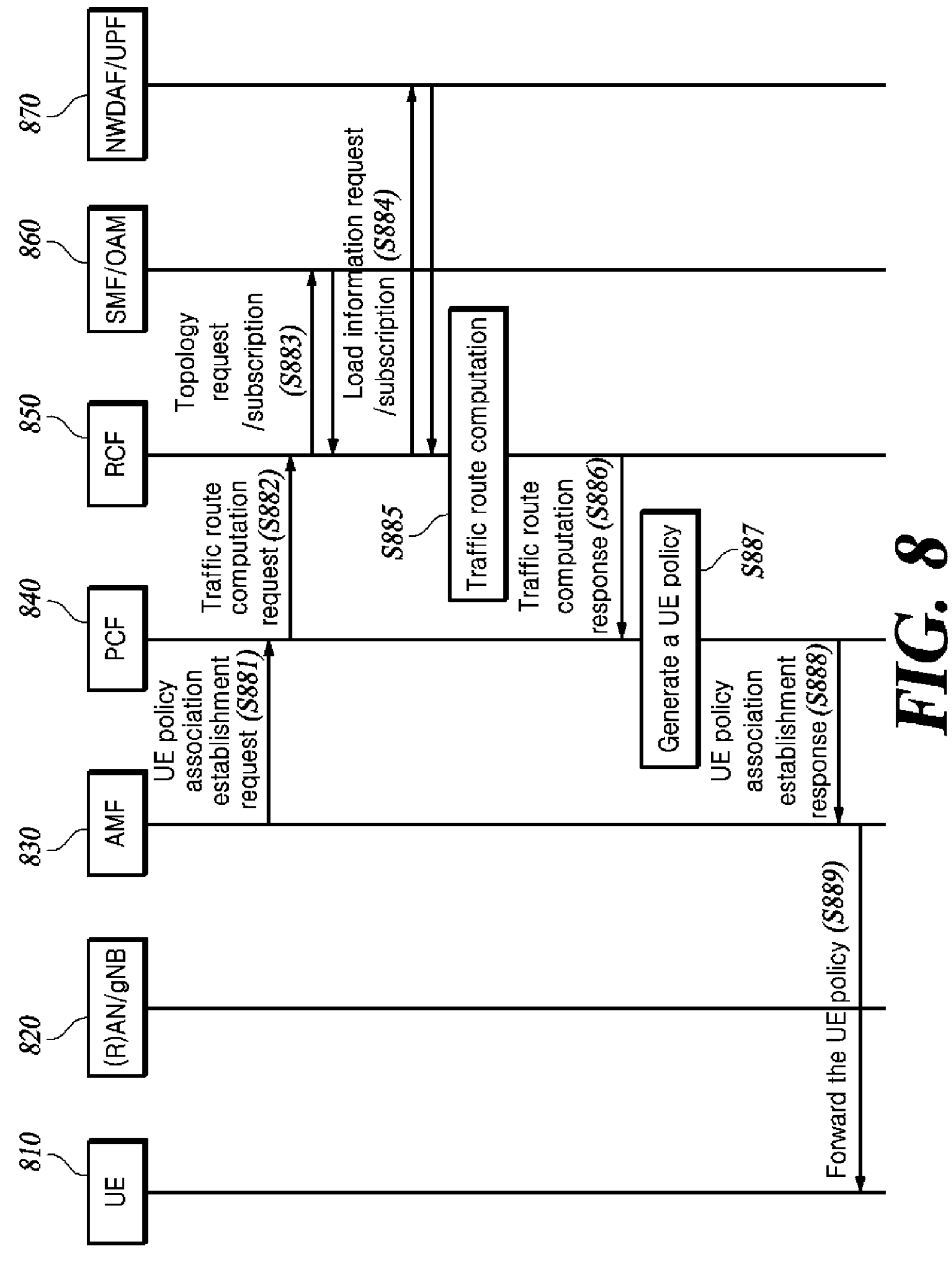
FIG. 8 is a flow diagram illustrating a method for establishing and forwarding a traffic path according to an embodiment of the present disclosure.

FIG. 8 is a flow diagram illustrating a method for establishing and forwarding a traffic path according to an embodiment of the present disclosure.

For example, FIG. 8 assumes that the RCF exists as a separate NF as in FIG. 4; however, as shown in FIGS. 6 and 7, FIG. 8 may be applied the same to a case where the RCF is included in the PCF (FIG. 6) or a case where the RCF is included in the SMF (FIG. 7). For the convenience of description, however, it is assumed that the RCF exists as a separate NF.

Referring to FIG. 8, the AMF 830 may forward a UE policy association establishment request message to the PCF 840 in the step 881. For example, the UE 810 may be connected to a network and receive a service. The UE 810 may transmit a registration request message to the base station 820, and the base station 820 may select the AMF 830 to register the UE to the network. After being connected to the network, the UE 810 may forward UE service requirements and policy-related information to the AMF 830, and the AMF 830 may forward the UE policy association establishment request message to the PCF 840 based on the UE service requirements and policy-related information. Specifically, the UE policy association establishment request message may include subscription data and UE context information. Here, the subscription data may include parameter information related to other UE services, such as QoS profile, service priority, MPS priority, and MCX priority. Also, for example, the subscription data may further include information related to the following operations, which may not be limited to a specific form.

For example, the QoS profile may include a profile indicating QoS requirements for a service to which the UE has subscribed and may include data rate, delay time, packet error rate, and other information based on the characteristics of the service to which the UE has subscribed. Also, service priority is priority information for services to which the UE has subscribed and may be used to recognize the priority of the corresponding service among a plurality of services. Also, the priority of multimedia data may be recognized through the MPS priority, and priority information for a mission critical service to which the UE has subscribed may be recognized through the MCX priority. Also, the UE policy association establishment request message may include UE context information. For example, UE context information may include at least one of SUPI, access type, PEI, GPSI, UE location information, UE time zone, serving network, RAT type, UE access selection, PDU session selection policy, and other information, which is not limited to a specific form. In other words, when the AMF 830 requests the PCF 840 to generate a UE policy, the AMF 830 may forward the information above to enable the PCF 840 to generate a UE policy.

The PCF 840 may check the UE service requirements and policy-related information through the UE policy association establishment request message and generate a UE policy. For example, the UE policy may include a policy for establishing a connection between the UE and a service provider, which is not limited to a specific form.

Here, when the PCF 840 receives a UE policy association establishment request message, the PCF 840 may obtain traffic path information for each service. For example, the PCF 840 may forward a traffic route computation request message to the RCF 450 in the step 882. Here, the RCF 850 may be an NF that generates an optimal data path, which may not be limited to the specific name. For example, an NF that performs the same function as the RCF 850 may be defined with a different name. Also, the RCF may be an individual network function but is not limited to the specific form. For example, the RCF may be combined with another NF or may be included in another NF. In the following, for the convenience of descriptions, each NF is assumed to be the RCF but is not limited to the specific assumption.

When the RCF 850 receives a traffic route computation request message in the step 883, the RCF 850 may forward a topology request message to the SMF/OAM (operation, administration, and maintenance) 860. Also, the RCF 850 may obtain changed topology information from the SMF/OAM 860 when the topology information changes through subscription. Also, the RCF 850 may forward a load information request message to the NWDAF)/UPF 870 in the step 884.

Also, the RCF 850 may obtain changed load information from the NWDAF/UPF 870 when the load information changes through subscription. More specifically, the RCF 850 may obtain load information and load analysis/prediction information from the NWDAF through request and subscription. Since the NWDAF performs the function of collecting and analyzing load information, the RCF 850 may obtain both load information and load analysis/prediction information from the NWDAF. On the other hand, the RCF 450 may obtain load information from the UPF. Since the UPF forwards only its own measurement information, the RCF 850 may obtain load information from the UPF. Here, the SMF may be an NF that manages sessions for services in a network, through which a UE may receive a service. Also, the OAM may be an NF that performs operation, management, and maintenance in the network, supporting monitoring the network and identifying and resolving problems. Based on the operation above, the SMF/OAM 860 may recognize the topology established based on the path through which traffic is forwarded, and the RCF 850 may obtain the topology information by requesting the corresponding information from SMF/OAM 860.

The NWDAF may be an NF that improves service quality by collecting and analyzing data and optimizing network resources based on the analyzed data. The NWDAF may deliver a result from the analyzed data to other NFs. Also, the UPF may be an NF that forwards user data in the network. The UPF may transmit and process data packets and may maintain data transmission performance and ensure stability through QoS management. Based on the operation above, the RCF 850 may obtain load information and load analysis/prediction information from the NWDAF. Also, the RCF 850 may obtain load information from the UPF.

Then, the RCF 850 may calculate a traffic path based on at least one of the obtained topology information, obtained load information, and other information in the step 485; and forward a traffic route computation response message that includes the calculated traffic path information to the PCF 840 in the step 886. Here, for example, a traffic path may be generated for each application, and an RID corresponding to each traffic path may be returned, as described above. Here, after computing the traffic path, the RCF 850 may forward the RID corresponding to the traffic path generated for each application to the PCF 840; differently from FIG. 4, the RCF 850 may not forward the RID to the base station 820 and the SMF.

The PCF 840 may generate a UE policy by reflecting the obtained traffic path information in the step 887 and forward the generated UE policy information in the step 888 to the AMF 830 by including the UE policy information in the UE policy association establishment response. Afterward, the AMF 830 may forward the corresponding UE policy information to the UE 810 in the step 889. Here, the UE policy information may include traffic path information together with the RID information corresponding to the traffic path generated for each application. Specifically, differently from FIGS. 4, 6, and 7, since the RID is not forwarded to the (R)AN/gNB 820, the UE policy information may further include the traffic path information together with the RID information, as shown in Table 7 above. Here, for example, the base station 820 and the SMF may obtain the RID information based on the PDU session establishment request procedure.

Figure 9A:
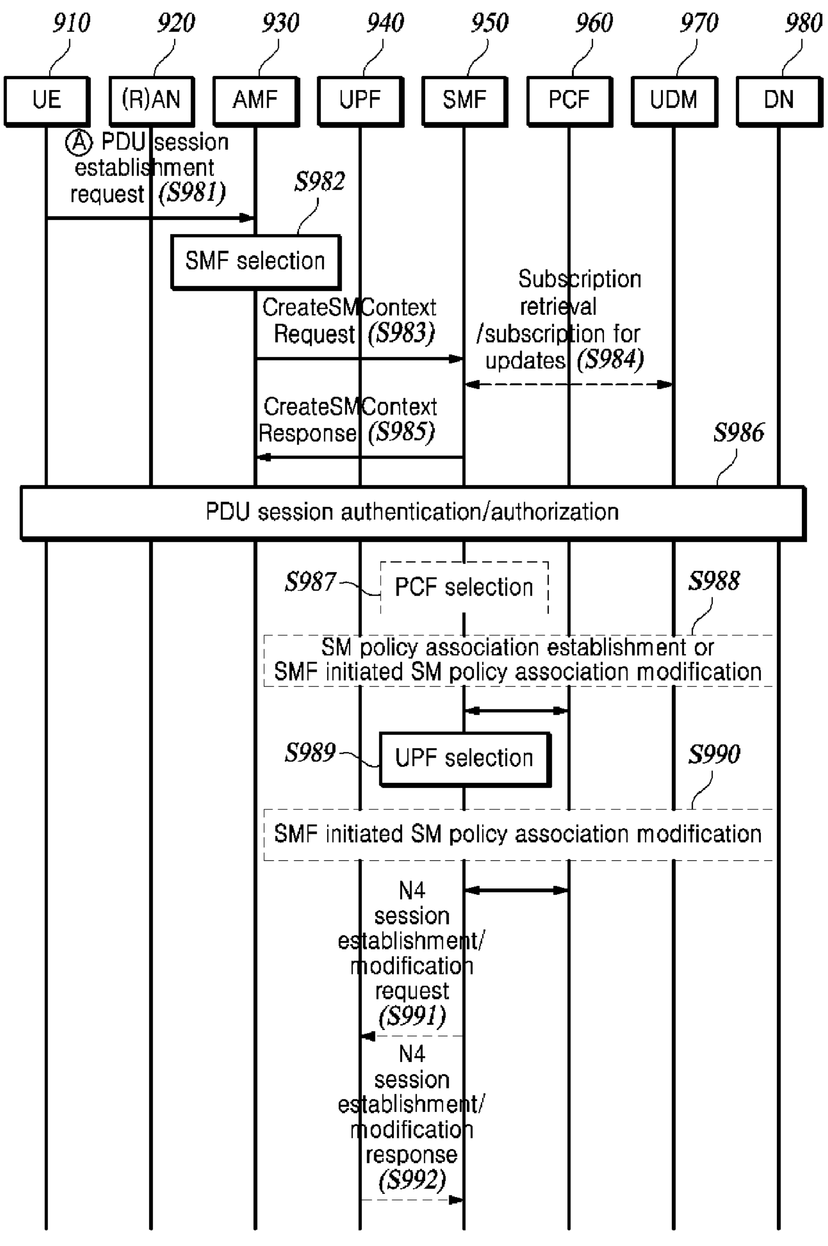
FIGS. 9A and 9B are flow diagrams illustrating a method for obtaining RID by a base station and SMF according to an embodiment of the present disclosure.
Figure 9B:
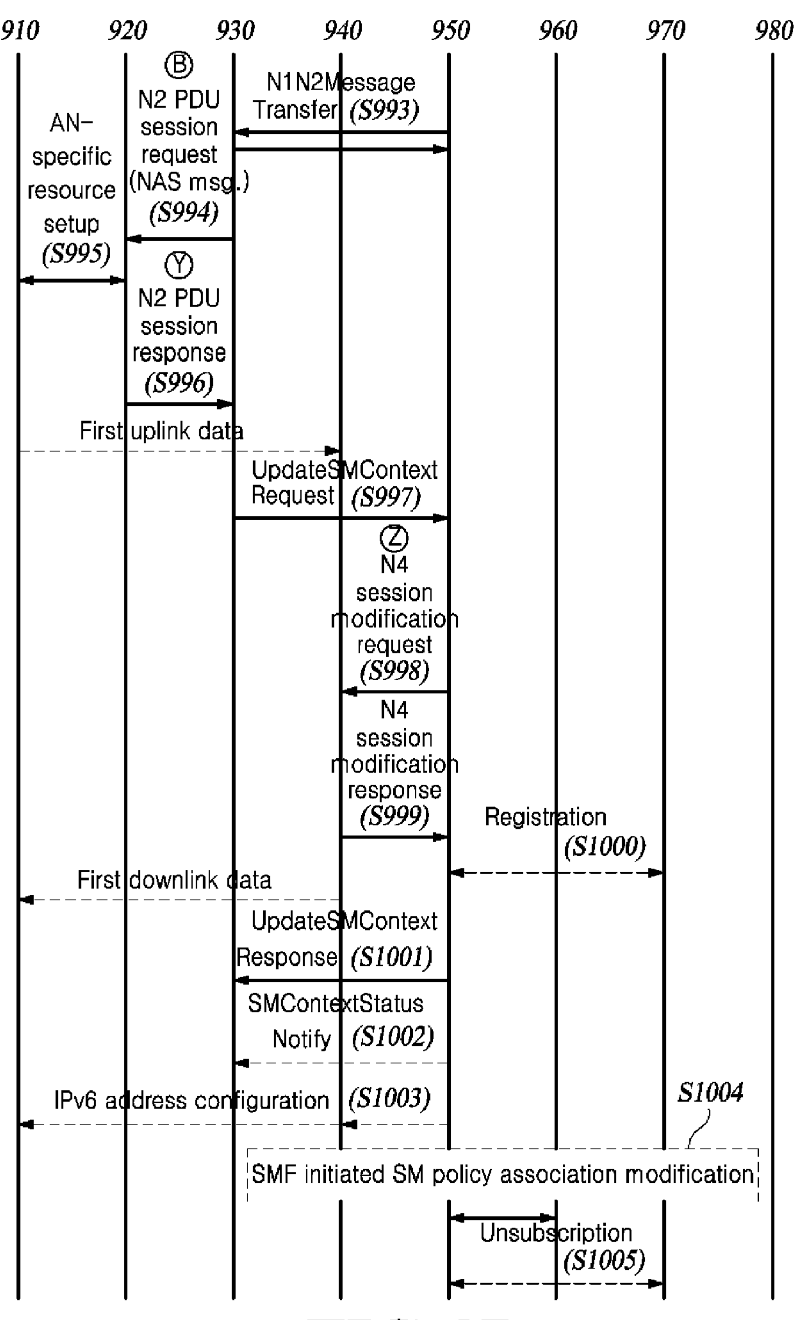

FIGS. 9A and 9B are flow diagrams illustrating a method for obtaining RID by a base station and SMF according to an embodiment of the present disclosure.

Referring to FIG. 9A, the UE 910 may perform RRC connection to connect to the network. Afterward, the UE 910 may transmit a PDU session establishment request message to the AMF 930 to establish a PDU session in the step 981 (A in FIG. 9A). For example, a PDU session establishment request may be a NAS message and include various pieces of configuration information for establishing a PDU session. For example, the PDU session establishment request may include single-network slice selection assistance information (S-NSSAI), UE request data network name (DNN), PDU session ID, PDU session type, existing PDU session ID, N1 SM container, Quality of Service (QOS) information, and other information. For example, S-NSSAI may include slice/service type (SST) indicating a network slice type and a slice differentiator (SD) as selective information that supplements the SST to identify a plurality of network slices, which may not be limited to the specific example. Also, the UE request DNN may identify the data network related to a service used by the UE using the name of the data network requested by the UE. Also, the PDU session ID may be a PDU session ID to be newly established, and the existing PDU session ID may be the ID of a previous PDU session. Here, the PDU session establishment request may further include the route selection information. For example, the route selection information may include RID information and information on the actual traffic path. In other words, based on an application corresponding to the PDU session, the RID information and the information on the actual traffic path may be forwarded to the AMF 930 by being included in the PDU session request establishment message, where the AMF may store the corresponding information and other information. For example, the route selection information may set the RID information and the actual traffic path information as "RID 1 (G1-U1-S1-U2)" as shown in Table 3; the specific configuration above is only an example, and the route selection information may not be limited to the specific example. Also, for example, the N1 SM container may include a PDU session establishment request and a port management information container.

Afterward, the AMF 930 may receive the PDU session establishment request message, perform authentication and registration for the UE 910, and select the SMF 950, in the step 982. The AMF 930 may select the SMF 950 based on the type of service used by UE 910, QoS requirements, and other factors. After the SMF 950 is selected, the AMF 930 transmits an SM context request (Nsmf_PDUsession_CreateSMContext Request) message for generating SM context to the SMF 950 in the step 983; in the step 984, the SMF 950 performs the subscription retrieval/subscription for updates procedure with the UDM 970, obtains subscription information from the UDM 970, and generate the SM context. Afterward, the SMF 950 may complete establishment of the PDU session by forwarding an SM context response (Nsmf_PDUsession_CreateSMContext Response) message to the AMF 930 in the step 985. For example, the SM context may include information for a PDU session, a PDU session identifier, security and encryption settings for the PDU session, QoS information, and other information. As another example, the SM context may further include the route selection-related information, which may not be limited to the specific example.

When establishment of the PDU session is completed, a PDU session authentication/authorization process is performed in the step 986.

The SMF 950 may perform PCF 960 selection in the step 987 and may establish or modify SM policy association (or session management policy) based on the policy of the selected PCF 960 in the step 988. Afterward, the SMF 950 may select the UPF 940 and establish a session (N4 session) with the UPF 940, in the step 989.

The SMF 950 may modify (SMF initiated SM policy association modification procedure) the session management policy in the step 990.

Afterward, the SMF 950 transmits the N4 session establishment/modification request message to the UPF 940 in the step 991, and the UPF 940 transmits the N4 session establishment/modification response message to the SMF 950.

Afterward, the SMF 950 may perform message exchange (Nsmf_Communication N1N2MessageTransfer) with the AMF 930 in the step 993, and the AMF 930 may transmit a request message (N2 PDU session request message or session establishment request message) for establishing a session (N2 session) with the base station 920 in the step 994. At this time, the N2 PDU session request message may be transmitted through a NAS message. Here, for example, the session establishment request message transmitted from the AMF 930 to the base station 920 may include UPF tunneling information (e.g., UPF GTP-U tunnel endpoint) and QoS information as PDU session information, which is not limited to the specific example. As another example, the session establishment request message may include the route selection information (B in FIG. 9B). In other words, the AMF 930 may forward stored route selection information in the process of establishing an N2 session with the base station 920. For example, the route selection information may be set to "RID 1 (G1-U1-S1-U2)" as shown in Table 3 above as RID information and information on the traffic path, where the specific example is used only for the illustration purpose, and the present disclosure is not limited to the specific example. Through the operation above, the base station 920 may check the RID of the application related to the corresponding PDU session. Afterward, the base station 920 may exchange a message (AN-specific resource setup, PDU session establishment Accept) with the UE 910 to set up (R)AN-related resources in the step 995 and transmit a response message for session establishment to the AMF 930 in the step 996. Here, the PDU session establishment response transmitted to the AMF 930 may include (R)AN tunneling information (e.g., (R)AN GTP-U tunnel endpoint), route selection information, and other information, and a PDU session may be established based on the information described above (Y in FIG. 9B). Through the operation above, in the occurrence of uplink data, the UE 910 may transmit the data to the base station 920, and the base station 920 may transmit packets based on the route information.

Afterward, the AMF 930 may transmit a PDU session update SM context request (Nsmf_PDUsession_UpdateSM-ContextRequest) message to the SMF 950 in the step 997. The SMF 950 may recognize route selection information, (R)AN GTP-U tunnel endpoint information, and other information based on the PDU session update SM context request. Here, in the step 998, the SMF 950 may generate a downlink traffic path based on the route selection information, (R)AN GTP-U tunnel endpoint information, and other information and forward the downlink traffic path to the UPF 940 along with an N4 session modification request (Z in FIG. 9B). For example, the downlink traffic path may be in the opposite direction of the traffic path. As a specific example, as shown in Table 3, "U2-S1-U1-G1" may be generated as a downlink traffic path based on "RID 1 (G1-U1-S1-U2)", and the corresponding information may be forwarded to the UPF 940. Afterward, the SMF 950 may receive the N4 session modification response message in the step 999.

Through the operation above, in the occurrence of downlink data, packets may be transmitted to the UE 910 through the UPF 940. Also, a registration process may be performed between the SMF 950 and the UDM 970 in the step 1000.

Also, in the step 1001, the SMF 950 may transmit a PDU session update SM context response (Nsmf_PDU session_UpdateSMContextResponse) message to the AMF 930.

Also, in the step 1002, the SMF 950 may transmit a PDU session update SM context status notification (Nsm_P-DUsession_SMContextStatusNotify) message to the AMF 930.

Also, the SMF 950 may configure the IPV6 address with the UE 910 in the step 1003.

Afterward, the SMF 950 may modify (SMF initiated SM policy association modification procedure) the session management policy in the step 1004.

Finally, in the step 1005, a subscription cancelling process may be performed between the SMF 950 and the UDM 970.

Figure 10A:
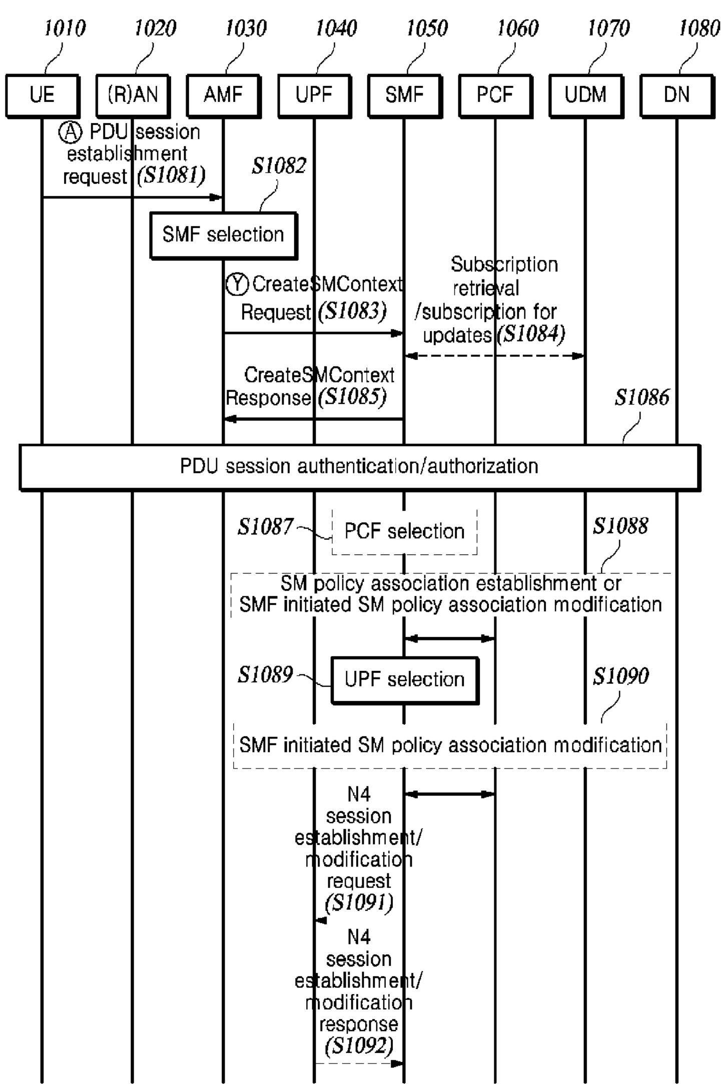
FIGS. 10A and 10B are flow diagrams illustrating another method for obtaining RID by a base station and SMF according to an embodiment of the present disclosure.
Figure 10B:
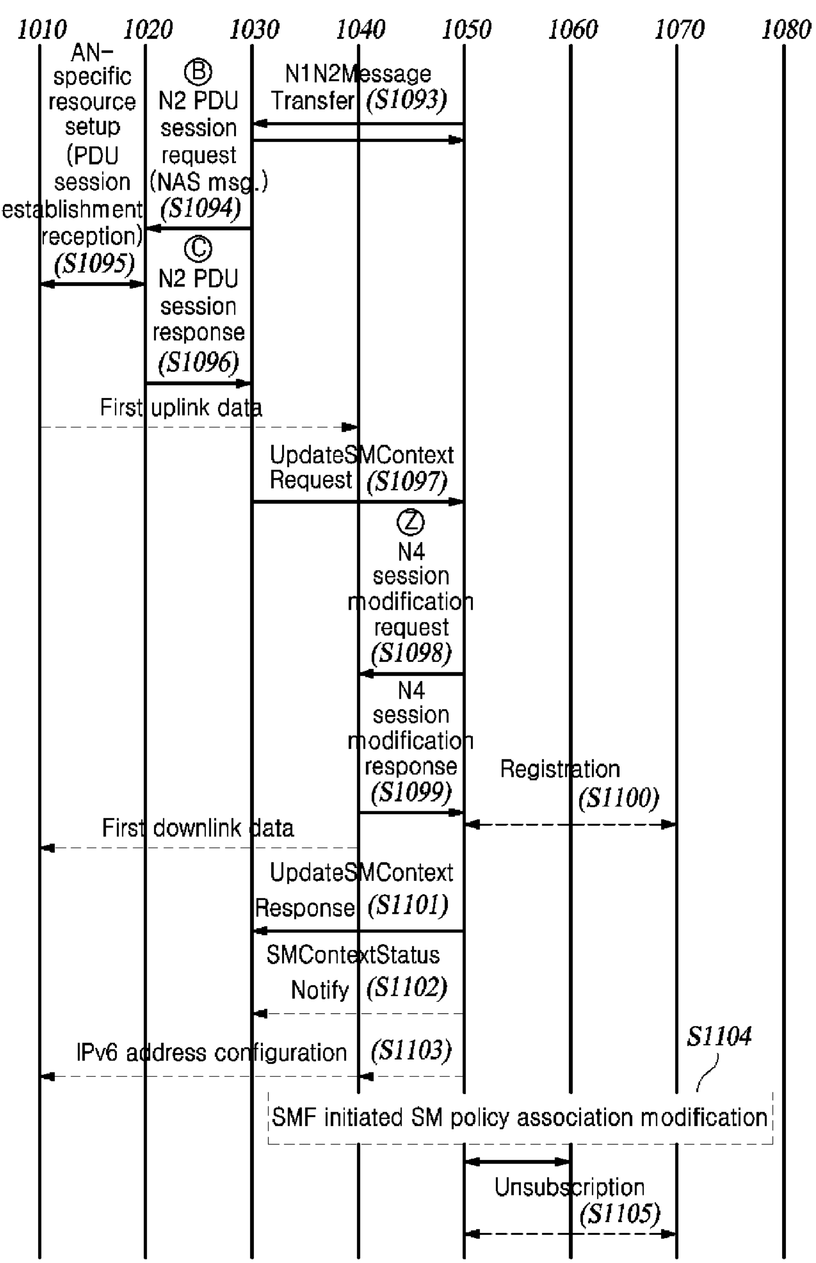

FIGS. 10A and 10B are flow diagrams illustrating another method for obtaining RID by a base station and SMF according to an embodiment of the present disclosure.

Referring to FIG. 10A, the UE 1010 may perform RRC connection to connect to the network. Afterward, the UE 1010 may transmit a PDU session establishment request message to the AMF 1030 to establish a PDU session in the step 1081 (A in FIG. 10A). For example, a PDU session establishment request may be a NAS message and include various pieces of configuration information for establishing a PDU session. For example, the PDU session establishment request may include S-NSSAI, UE request DNN, PDU session ID, PDU session type, existing PDU session ID, N1 SM container, QoS information, and other information. For example, S-NSSAI may include SST indicating a network slice type and an SD as selective information that supplements the SST to identify a plurality of network slices, which may not be limited to the specific example. Also, the UE request DNN may identify the data network related to a service used by the UE using the name of the data network requested by the UE. Also, the PDU session ID may be a PDU session ID to be newly established, and the existing PDU session ID may be the ID of a previous PDU session. Here, the PDU session establishment request may further include the route selection information. For example, the route selection information may include RID information and information on the actual traffic path. In other words, based on an application corresponding to the PDU session, the RID information and the information on the actual traffic path may be forwarded to the AMF 1030 by being included in the PDU session request establishment message, where the AMF may store the corresponding information and other information. For example, the route selection information may set the RID information and the actual traffic path information as "RID 1 (G1-U1-S1-U2)" as shown in Table 3; the specific configuration above is only an example, and the route selection information may not be limited to the specific example. Also, for example, the N1 SM container may include the route selection information together with a PDU session establishment request and a port management information container. In other words, differently from FIG. 9A, the N1 SM container may include the route selection information, and the route selection information may include the RID information and information on the actual traffic path.

Afterward, the AMF 1030 may receive the PDU session establishment request message, perform authentication and registration for the UE 1010, and select the SMF 1050, in the step 1082. The AMF 1030 may select the SMF 1050 based on the type of service used by UE 1010, QOS requirements, and other factors. After the SMF 1050 is selected, the AMF 1030 may forward an SM context request (Nsmf_PDUsession_CreateSMContext Request) message for creating SM context to the SMF 1050 in the step 1083. Here, the route selection information may be forwarded from the AMF 1030 to the SMF 1050 (Y in FIG. 10A). The SMF 1050 may perform the subscription retrieval/subscription for updates procedure with the UDM 1070, obtains subscription information from the UDM 1070, and create the SM context in the step 1084; the SMF 1050 may complete establishment of the PDU session by forwarding an SM context response (Nsmf_PDUsession_CreateSMContext Response) message to the AMF 1030 in the step 1085. For example, the SM context may include information for a PDU session, a PDU session identifier, security and encryption settings for the PDU session, QoS information, and other information. Also, the SM context may further include the route selection-related information forwarded through the N1 SM container, and the SMF 1050 may store the corresponding information.

When establishment of the PDU session is completed, a PDU session authentication/authorization process is performed in the step 1086.

Afterward, the SMF 1050 may perform PCF 1060 selection in the step 1087 and may establish or modify SM policy association (or session management policy) based on the policy of the selected PCF 1060 in the step 1088. Also, the SMF 1050 may select the UPF 1040 in the step 1089 and establish a session (N4 session) with the UPF 1040.

The SMF 1050 may modify (SMF initiated SM policy association modification procedure) the session management policy in the step 1090.

Afterward, the SMF 1050 transmits the N4 session establishment/modification request message to the UPF 1040 in the step 1091, and the UPF 1040 transmits the N4 session establishment/modification response message to the SMF 1050.

Afterward, the SMF 1050 may perform message exchange (Nsmf_Communication N1N2MessageTransfer) with the AMF 1030 in the step 1093, and the AMF 1030 may transmit a request message (N2 PDU session request message or session establishment request message) for establishing a session (N2 session) with the base station 1020 in the step 1094. At this time, the N2 PDU session request message may be transmitted through a NAS message. Here, for example, the session establishment request message transmitted from the AMF 1030 to the base station 1020 may include UPF tunneling information (e.g., UPF GTP-U tunnel endpoint) and QoS information as PDU session information, which is not limited to the specific example. As another example, the session establishment request message may include the route selection information (B in FIG. 10B). In other words, the AMF 1030 may forward stored route selection information in the process of establishing an N2 session with the base station 1020. For example, the route selection information may be set to "RID 1 (G1-U1-S1-U2)" as shown in Table 3 above as RID information and information on the traffic path, where the specific example is used only for the illustration purpose, and the present disclosure is not limited to the specific example. Through the operation above, the base station 1020 may check the RID of the application related to the corresponding PDU session. Afterward, the base station 1020 may exchange a message (AN-specific resource setup, PDU session establishment Accept) with the UE 1010 to set up (R)AN-related resources in the step 1095 and transmit a response message for session establishment to the AMF 1030 in the step 1096 (C in FIG. 10B). Here, the PDU session establishment response transmitted to the AMF 1030 may include (R)AN tunneling information (e.g., (R)AN GTP-U tunnel endpoint) and other information, and a PDU session may be established based on the information described above. In the occurrence of uplink data, the UE 1010 may transmit the data to the base station 1020, and the base station 1020 may transmit packets based on the route information.

Afterward, the AMF 1030 may transmit a PDU session update SM context request (Nsmf_PDUsession_UpdateSMContextRequest) message to the SMF 1050 in the step 1097. The SMF 1050 may recognize (R)AN GTP-U tunnel endpoint information and other information based on the PDU session update SM context request. Here, in the step 1098, the SMF 1050 may generate a downlink traffic path based on the stored route selection information, (R)AN GTP-U tunnel endpoint information, and other information and forward the downlink traffic path to the UPF 1040 along with an N4 session modification request (Z in FIG. 10B). For example, the downlink traffic path may be in the opposite direction of the traffic path. As a specific example, as shown in Table 3, "U2-S1-U1-G1" may be generated as a downlink traffic path based on "RID 1 (G1-U1-S1-U2)", and the corresponding information may be forwarded to the UPF 1040. Afterward, the SMF 1050 may receive the N4 session modification response message in the step 1099.

Through the operation above, in the occurrence of downlink data, packets may be transmitted to the UE 1010 through the UPF 1040. Also, a registration process may be performed between the SMF 1050 and the UDM 1070 in the step 1100.

In the step 1101, the SMF 1050 may transmit a PDU session update SM context response (Nsmf_PDUsession_UpdateSMContextResponse) message to the AMF 1030.

Also, in the step 1102, the SMF 1050 may transmit a PDU session update SM context status notification (Nsm_PDUsession_SMContextStatusNotify) message to the AMF 1030.

Also, the SMF 1050 may configure the IPV6 address with the UE 1010 in the step 1103.

Afterward, the SMF 1050 may modify (SMF initiated SM policy association modification procedure) the session management policy in the step 1104.

Finally, in the step 1105, a subscription cancelling process may be performed between the SMF 1050 and the UDM 1070.

Figure 11A:
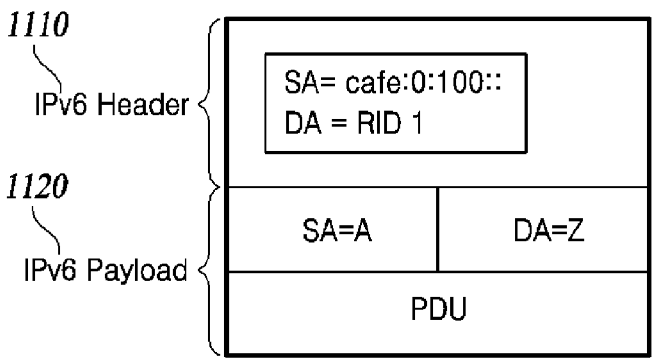

FIGS. 11A and 11B illustrate a method for applying RID during a data transmission process according to an embodiment of the present disclosure.

During data transmission, the UE may employ the format based on FIG. 11A to indicate the RID to the base station. Here, data may be transmitted from a source node to a destination node based on the RID. For example, the IPV6 header 1110 may include information on the source node (e.g., the address of the UE) and information on the next destination node (e.g., RID 1 information). Also, the IPV6 payload 1120 may include UE information (A) for the source node of the packet and DN information (Z) for the destination node. In other words, based on the DA value of the IPV6 header 1110, the base station may recognize the RID and perform transmission by recognizing the traffic transmission path based on the recognized RID.

As another example, referring to FIG. 11B, the format for indicating a traffic path according to the RID recognized by the base station may further include the SRv6 header (SRH) 1130 in addition to the IPV6 header 1110 and the IPV6 payload 1120. For example, the SRH 1130 may include SID information for each path based on the traffic path, which may not be limited to the specific example.

The RID may be an ID that indicates a traffic path. Here, the RID may be different from the SID of SRv6. More specifically, the SID may be a 128-bit IPv6 address. The segment list may establish an SRv6 path by combining multiple segments based on the SID. The SID may be composed of, for example, Locator, Function, and Arguments. For example, Locator may identify the location of a node and provide an IPV6 routing function, and Function may refer to a function executed in each node based on the corresponding packet. For example, Function may instruct routing (or forwarding) of the corresponding packet at a specific node. Arguments may include parameter information to be used as auxiliary fields for the Function. For example, TEID may be included in the Argument.

For example, unlike the SID, the RID may be an ID that consists only of Locator information (prefix) and indicates a traffic path. In other words, RID does not include TEID and may not require Function configuration to perform a function. Specifically, RID may be an indicator that indicates only a routing path and may indicate only a traffic path. In other words, the RID may be an indicator that indicates only the traffic path rather than a configuration that indicates an operation or a service performed at each service node while actual data is forwarded through the service nodes. Therefore, the RID may have a different structure from the SID. As a specific example, as shown in Table 3 above, the RID may be configured in the form of "RID 1: G1 (Prefix)-U1 (Prefix)-S1 (Prefix)-U2 (Prefix)" but may not be limited to the specific example.

Figure 12:
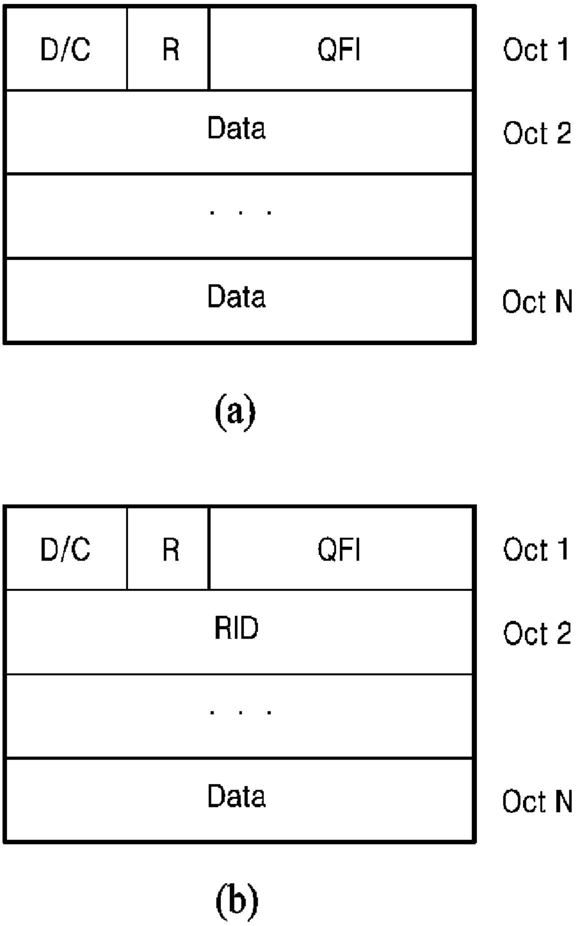
FIG. 12 illustrates another method for applying RID during a data transmission process according to an embodiment of the present disclosure.

FIG. 12 illustrates another method for applying RID during a data transmission process according to an embodiment of the present disclosure.

RID data according to an embodiment of the present disclosure may be used to determine a routing path for segment routing. As shown in FIG. 12(*b*), RID data may be transmitted by being included in the service data adaptation protocol (SDAP) header. The SDAP may be an access stratum (AS) layer protocol and may be a protocol that applies compression, security, and QoS functions before data packets are transmitted. For example, RID information may be included in the SDAP header for uplink. As shown in FIG. 12(*a*), the SDAP header may include a data/control (D/C) field, a reserved (R) field, a QoS flow identifier (QFI) field, and a data field. Here, the D/C field may indicate whether a PDU is a data PDU or a control PDU. Also, the R field is a reserved bit and may indicate an unused field. Also, the QFI field may indicate a field used to identify a QoS flow. For example, RID may be added after the fields described above (i.e., D/C field, R field, QFI field). As another example, the RID may have a different size based on the message format. Based on the descriptions above, the size of the field to which the RID is allocated may be set differently according to the message format of the RID, which may not be limited to a specific form.

Figure 13:
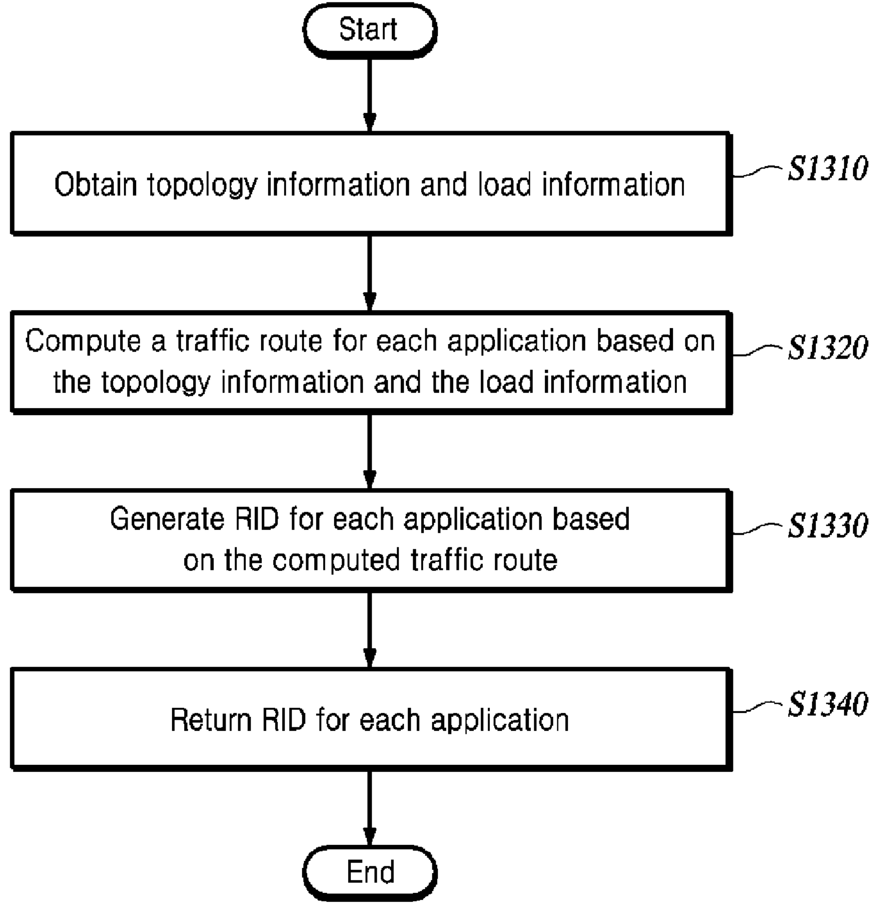
FIG. 13 is a flow diagram for NF applicable to the present disclosure, which establishes a traffic path and forwards the established traffic path.

FIG. 13 is a flow diagram for NF applicable to the present disclosure, which establishes a traffic path and forwards the established traffic path.

Referring to FIG. 13, the NF, which establishes a traffic path and forwards the established traffic path, may comprises a memory storing at least one program, a transceiver transmitting and receiving at least one signal, and a processor executing at least one program stored in the memory.

Here, the NF may obtain topology information and load information in the step 1310. Afterward, the NF may perform traffic route computation for each application based on the topology information and the load information in the step 1320 and generate an RID for each application based on the traffic route computation in the step 1330. Afterward, the NF may return the RID for each application in the step 1340. For example, the NF may be the RCF described above. At this time, the NF may transmit a topology request message to the SMF/OAM and obtain a topology response message containing the topology information from the SMF/OAM. Also, the NF may transmit a load request message to the NWDAF/UPF and obtain a load response message containing the load information from the NWDAF/UPF. Also, when the NF receives a traffic route computation request message from the PCF, the NF may perform traffic route computation. When the PCF receives the UE policy association establishment request message from the AMF, the PCF transmits the traffic route computation request message to the NF. The NF generates a traffic path for each application and transmits a traffic route computation response message including the RID for each application corresponding to the traffic path to the PCF. Afterward, the PCF may generate a UE policy based on the RID for each application and transmit a UE policy association establishment response message including the generated UE policy to the AMF. Also, the NF may further transmit the generated RID for each application to the base station. The base station may manage RID-related information based on the RID for each application. For example, the FIB/RIB may be configured using the RID-related information, which may not be limited to the specific description. Also, the NF may further transmit the generated RID for each application to the SMF. For example, when the SMF and the UPF perform the N4 session establishment procedure or the N4 session modification procedure, the SMF may forward the traffic path to the UPF based on the obtained RID information, through which the UPF may recognize the traffic path information.

As another example, the NF may be the PCF. When the NF receives the UE policy association establishment request message from the AMF, the NF may obtain the topology information and the load information and generate the RID for each application. Afterward, the NF may generate a UE policy based on the RID for each application and transmit the UE policy association establishment response message including the UE policy to the AMF. Here, the NF may further transmit the generated RID for each application to the base station, and the base station may manage RID-related information based on the RID for each application, which is the same as described above. Also, the NF may further transmit the generated RID for each application to the SMF, and when the SMF and the UPF perform the N4 session establishment procedure or the N4 session modification procedure, the SMF may forward the traffic path to the UPF based on the obtained RID information, which is the same as described above.

As yet another example, the NF may be the SMF. When the NF receives the traffic route computation request message from the PCF, the NF may perform traffic route computations based on the topology information and the load information. Here, when the PCF receives the UE policy association establishment request message from the AMF, the PCF transmits the traffic route computation request message to the NF, and the NF may transmit a traffic route computation response message including the generated RID for each application to the PCF. Also, the PCF may generate a UE policy based on the RID for each application and transmit the UE policy association establishment response message including the generated UE policy to the AMF, which is the same as described above. Here, the NF may further transmit the generated RID for each application to the base station, and the base station may manage RID-related information based on the RID for each application. Also, the NF may further transmit the generated RID for each application to the SMF, and when the SMF and the UPF perform the N4 session establishment procedure or the N4 session modification procedure, the SMF may forward the traffic path to the UPF based on the obtained RID information, which is the same as described above.

As still another example, when the NF receives the traffic route computation request message from the PCF, the NF may perform traffic route computations. Here, when the PCF receives the UE policy association establishment request message from the AMF, the PCF transmits the traffic route computation request message to the NF, and the NF may transmit a traffic route computation response message including the generated RID for each application to the PCF. The PCF may generate a UE policy based on the RID for each application and transmit the UE policy association establishment response message including the generated UE policy to the AMF, and the AMF may transmit the UE policy to the UE.

Here, when the UE transmits the PDU session establishment request message to the AMF based on a first application, the PDU session establishment request message may include a first RID corresponding to the first application among RIDs for applications. Afterward, while the AMF performs the PDU session establishment procedure based on the PDU session establishment request message, the N2 PDU session establishment request message transmitted from the AMF to the base station may include the first RID corresponding to the first application, and the base station may manage RID-related information based on the first RID, which is the same as described with reference to FIGS. 9A and 9B.

Also, for example, the PDU session establishment response message transmitted to the AMF from the base station may include (R)AN tunneling information (e.g., (R)AN GTP-U tunnel endpoint), route selection information, and other information. Also, the AMF may transmit a PDU session update SM context request message to the SMF. The SMF may recognize the route selection information, (R)AN GTP-U tunnel endpoint information, and other information based on the PDU session update SM context request. The SMF may generate a downlink traffic path based on the route selection information, (R)AN GTP-U tunnel endpoint information, and other information and forward the generated downlink traffic path to the UPF 940 together with the N4 session modification request.

Also, for example, when the UE requests transmission of packets including the first RID based on the first application, the NF may forward the packets through a traffic path indicated by the first RID. For example, the first RID may be included in the destination address information of the IPV6 header. In another example, the first RID may be included in the SDAP header, which is the same as described above.

Figure 14:
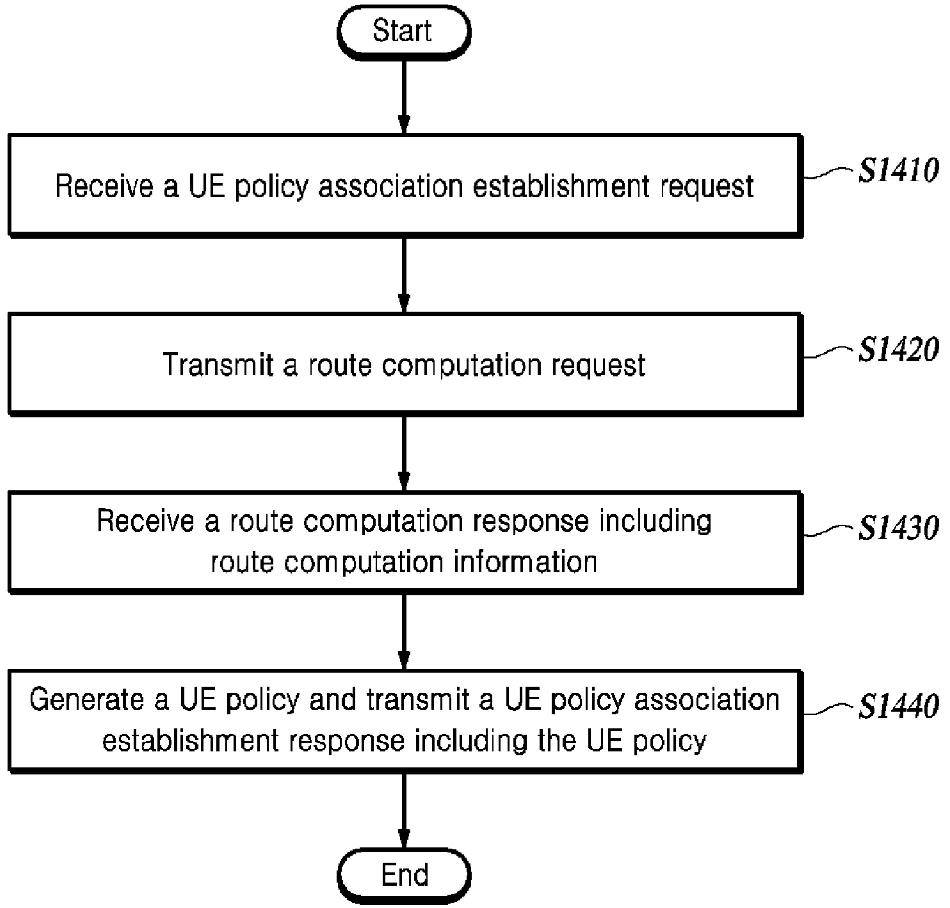
FIG. 14 is a flow diagram for PCF operation according to an embodiment of the present disclosure.

FIG. 14 is a flow diagram for PCF operation according to an embodiment of the present disclosure.

Referring to FIG. 14, when the PCF receives the UE policy association establishment request message from the AMF in the step 1410, the PCF may transmit the route computation request message to the RCF in the step 1420. Afterward, the PCF may receive a route computation response message including the UE path information in the step 1430. Afterward, the PCF may generate a UE policy and transmit the UE policy association establishment response message including the generated UE policy to the AMF in the step 1440. Here, the RCF may obtain the topology information and the load information and perform traffic route computations for each application and generate the RID for each application based on the traffic route computations. Afterward, the RCF may return the RID for each application, which is the same as described above.

The components described in the example embodiments may be implemented by hardware components including, for example, at least one digital signal processor (DSP), a processor, a controller, an application-specific integrated circuit (ASIC), a programmable logic element, such as an FPGA, other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The method according to example embodiments may be embodied as a program that is executable by a computer, and may be implemented as various recording media such as a magnetic storage medium, an optical reading medium, and a digital storage medium.

Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing by, or to control an operation of a data processing apparatus, e.g., a programmable processor, a computer, or multiple computers. A computer program(s) may be written in any form of a programming language, including compiled or interpreted languages and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network.

Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic, magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc. and magneto-optical media such as a floptical disk, and a read only memory (ROM), a random access memory (RAM), a flash memory, an erasable programmable ROM (EPROM), and an electrically erasable programmable ROM (EEPROM) and any other known computer readable medium. A processor and a memory may be supplemented by, or integrated into, a special purpose logic circuit.

The processor may run an operating system (OS) and one or more software applications that run on the OS. The processor device also may access, store, manipulate, process, and create data in response to execution of the software. For purpose of simplicity, the description of a processor device is used as singular; however, one skilled in the art will be appreciated that a processor device may include multiple processing elements and/or multiple types of processing elements. For example, a processor device may include multiple processors or a processor and a controller. In addition, different processing configurations are possible, such as parallel processors.

Also, non-transitory computer-readable media may be any available media that may be accessed by a computer, and may include both computer storage media and transmission media.

The present specification includes details of a number of specific implements, but it should be understood that the details do not limit any invention or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination.

Similarly, even though operations are described in a specific order on the drawings, it should not be understood as the operations needing to be performed in the specific order or in sequence to obtain desired results or as all the operations needing to be performed. In a specific case, multitasking and parallel processing may be advantageous. In addition, it should not be understood as requiring a separation of various apparatus components in the above described example embodiments in all example embodiments, and it should be understood that the above-described program components and apparatuses may be incorporated into a single software product or may be packaged in multiple software products.

It should be understood that the example embodiments disclosed herein are merely illustrative and are not intended to limit the scope of the invention. It will be apparent to one of ordinary skill in the art that various modifications of the example embodiments may be made without departing from the spirit and scope of the claims and their equivalents.

What is claimed is:

1. An apparatus for establishing a traffic path and forwarding an established traffic path in a mobile communication system, the apparatus comprising:

a memory storing at least one program;

a transceiver transmitting and receiving at least one signal; and a processor executing at least one program stored in the memory, wherein the processor is configured to:

obtain at least one of topology information and load information, compute a traffic path for each application based on at least one of the topology information and the load information, and generate a routing identification (RID) for each application based on the computed traffic path, and wherein, when a User Equipment (UE) requests packet transmission including a first RID based on a first application, the packet is forwarded through a traffic path indicated by the first RID.

2. The apparatus of claim 1, wherein the processor transmits a topology request message to session management function/operation, administration, and maintenance (SMF/OAM) and obtains a topology response message including the topology information from the SMF/OAM.

3. The apparatus of claim 1, wherein the processor transmits a load request message to network data analytics function (NWDAF)/user plane function (UPF) and obtains the load response message including the load information from the NWDAF/UPF.

4. The apparatus of claim 3, wherein, when receiving a traffic route computation request message from a policy control function (PCF), the processor performs the traffic route computation, wherein, when the PCF receives a User Equipment (UE) policy association establishment request message from access management function (AMF), the PCF transmits the traffic route computation request message to route control function (RCF), and transmits a traffic route computation response message including the generated RID for each application to the PCF, wherein the PCF generates a UE policy based on the RID for each application and transmits a UE policy association establishment response message including the generated UE policy to the AMF.

5. The apparatus of claim 4, wherein the processor further transmits the generated RID for each application to a base station and SMF, respectively, wherein the base station manages RID-related information based on the RID for each application, and forwarding information base (FIB)/routing information base (RIB) is configured based on the RID-related information, and the SMF forwards a traffic path to UPF based on the RID for each application in N4 session establishment procedure or N4 session modification procedure.

6. The apparatus of claim 1, wherein, when receiving a UE policy association establishment request message from AMF, the processor obtains at least one of the topology information and the load information, generates the RID for each application, generates a UE policy based on the RID for each application, and transmits a UE policy association establishment response message including the UE policy to the AMF.

7. The apparatus of claim 6, wherein the processor further transmits the generated RID for each application to a base station and SMF, respectively, wherein the base station manages RID-related information based on the RID for each application, and forwarding information base (FIB)/routing information base (RIB) is configured based on the RID-related information, and the SMF forwards a traffic path to UPF based on the RID for each application in N4 session establishment procedure or N4 session modification procedure.

8. The apparatus of claim 1, wherein, when receiving a traffic route computation request message from PCF, the processor performs the traffic route computation based on the topology information and the load information, wherein, when the PCF receives a UE policy association establishment request message from AMF, the PCF transmits the traffic route computation request message to SMF, and transmits a traffic route computation response message including the generated RID for each application to the PCF, wherein the PCF generates a UE policy based on the RID for each application and transmits a UE policy association establishment response message including the generated UE policy to the AMF.

9. The apparatus of claim 8, wherein the processor further transmits the generated RID for each application to a base station, wherein the base station manages RID-related information based on the RID for each application, and forwarding information base (FIB)/routing information base (RIB) is configured based on the RID-related information, and the SMF forwards a traffic path to UPF based on the RID for each application in N4 session establishment procedure or N4 session modification procedure.

10. The apparatus of claim 1, wherein, when receiving a traffic route computation request message from PCF, the processor performs the traffic route computation, wherein, when the PCF receives a UE policy association establishment request message from AMF, the PCF transmits the traffic route computation request message to RCF, and transmits a traffic route computation response message including the generated RID for each application to the PCF, wherein the PCF generates a UE policy based on the RID for each application and transmits a UE policy association establishment response message including the generated UE policy to the AMF, and the AMF transmits the UE policy to the UE.

11. The apparatus of claim 10, wherein, when the UE transmits a packet data unit (PDU) session establishment request message to the AMF based on a first application, the PDU session establishment request message includes the first RID corresponding to the first application among the RIDs for applications, the AMF performs a PDU session establishment procedure based on the PDU session establishment request message, wherein N2 PDU session establishment request message transmitted to a base station from the AMF includes the first RID corresponding to the first application, the base station manages RID-related information based on the first RID, and forwarding information base (FIB)/routing information base (RIB) is configured based on the RID-related information.

12. The apparatus of claim 1, wherein the first RID is included in destination address information of the IPV6 header.

13. The apparatus of claim 1, wherein the first RID is included in service data adaptation protocol (SDAP) header.

14. A computer-implemented method using an apparatus for establishing a traffic path and forwarding an established traffic path in a mobile communication system, the method comprising:

obtaining at least one of topology information and load information;

computing a traffic path for each application based on at least one of the topology information and the load information; and generating a routing identification (RID) for each application based on the computed traffic path, wherein, when a User Equipment (UE) requests packet transmission including a first RID based on a first application, the packet is forwarded through a traffic path indicated by the first RID.

15. The method of claim 14, further comprising:

transmitting a topology request message to session management function/operation, administration, and maintenance (SMF/OAM); and obtaining a topology response message including the topology information from the SMF/OAM.

16. The method of claim 14, further comprising:

transmitting a load request message to network data analytics function (NWDAF)/user plane function (UPF); and obtaining the load response message including the load information from the NWDAF/UPF.

17. The method of claim 14, wherein the first RID is included in destination address information of the IPV6 header.

18. The method of claim 14, wherein the first RID is included in service data adaptation protocol (SDAP) header.

* * * * *